US012720422B2

(12) United States Patent
Tamura et al.

(10) Patent No.: US 12,720,422 B2
(45) Date of Patent: Aug. 25, 2026

(54) UE, CORE NETWORK NODE, ACCESS NETWORK NODE, AMF APPARATUS, TERMINAL, AND METHOD THEREFOR

(71) Applicant: NEC Corporation, Tokyo (JP)

(72) Inventors: Toshiyuki Tamura, Tokyo (JP); Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 587 days.

(21) Appl. No.: 18/012,189

(22) PCT Filed: Oct. 8, 2021

(86) PCT No.: PCT/JP2021/037263

§ 371 (c)(1), (2) Date: Dec. 21, 2022

(87) PCT Pub. No.: WO2022/080244

PCT Pub. Date: Apr. 21, 2022

(65) Prior Publication Data

US 2023/0276351 A1 Aug. 31, 2023

(30) Foreign Application Priority Data

Oct. 16, 2020 (JP) ................................ 2020-174586

(51) Int. Cl.
*H04W 48/18* (2009.01)
*H04W 60/00* (2009.01)

(52) U.S. Cl.
CPC ........... *H04W 48/18* (2013.01); *H04W 60/00* (2013.01)

(58) Field of Classification Search
CPC ..... H04W 48/18; H04W 60/00; H04W 48/02; H04W 8/20; H04W 60/04; H04W 88/14
See application file for complete search history.

(56) References Cited

U.S. PATENT DOCUMENTS

2018/0270713 A1* 9/2018 Park ...................... H04L 5/0053
2019/0029065 A1 1/2019 Park et al.
(Continued)

FOREIGN PATENT DOCUMENTS

JP 2020-500433 A 1/2020
JP 2020-502884 A 1/2020
(Continued)

OTHER PUBLICATIONS

JP Office Action for JP Application No. 2022-556895, mailed on Oct. 10, 2023 with English Translation.
(Continued)

*Primary Examiner* — Marcus Hammonds
(74) *Attorney, Agent, or Firm* — Sughrue Mion, PLLC

(57) ABSTRACT

An AMF apparatus (2) receives, from a terminal (1), a registration request message including first information indicating support for a restriction feature related to simultaneous use of network slices. The AMF apparatus receives, from a UDM apparatus (8), terminal subscription information including second information that indicates a restriction related to simultaneous use of network slices. Upon receiving the first information and the second information, the AMF apparatus (2) sends, to the terminal (1), a registration accept message including a Single Network Slice Selection Assistance Information (S-NSSAI) and third information. The third information is included in the terminal subscription information and indicates for the S-NSSAI a restriction related to simultaneous use of network slices. This can contribute, for example, to achieving registration management adapted to various restrictions on the use of network slices.

6 Claims, 18 Drawing Sheets

(56) References Cited

U.S. PATENT DOCUMENTS

| | | | | |
|---|---|---|---|---|
| 2020/0120721 | A1* | 4/2020 | Lau | H04W 76/11 |
| 2022/0338062 | A1* | 10/2022 | Bennett | H04W 48/06 |
| 2022/0338079 | A1* | 10/2022 | Wifvesson | H04W 12/068 |
| 2023/0052699 | A1* | 2/2023 | Ninglekhu | H04W 60/04 |
| 2023/0388909 | A1* | 11/2023 | Hedman | H04W 8/08 |

FOREIGN PATENT DOCUMENTS

| | | | |
|---|---|---|---|
| WO | 2019/048021 | A1 | 3/2019 |
| WO | 2019/229492 | A1 | 12/2019 |
| WO | 2021/200234 | A1 | 10/2021 |

OTHER PUBLICATIONS

NEC, KI#6 Sol#27: Solution #27 clarification update, 3GPP TSG SA WG2 #141e S2-2007726, Oct. 2, 2020.

ZTE, New WID on Enhancement of Network Slicing Phase 2, 3GPP TSG CT WG1 #126e C1-206064, Oct. 8, 2020.

Extended European Search Report for EP Application No. 21879983.1, dated on Nov. 3, 2023.

Qualcomm Incorporated et al., "TS 23.501: Slicing support for the 5GS UE", 3GPP Draft; S2-176646, Aug. 29, 2017, pp. 1-10.

NTT DOCOMO et al., "Key Issue #4 solution evaluation and interim conclusion", 3GPP Draft; S2-2006251, Sep. 1, 2020, pp. 1-11.

International Search Report for PCT Application No. PCT/JP2021/037263, mailed on Dec. 28, 2021.

3GPP SA WG1, "New WID on Study on Enhanced Access to and Support of Network Slice (from S1-202284)", SP-200571, 3GPP TSG SA Meeting # 88e, Electronic Meeting, Jun. 30-Jul. 3, 2020.

3GPP TS 23.502 V16.5.1 (2020-08) "3rd Generation Partnership Project; Technical Specification Group Services and System Aspects; Procedures for the 5G System (5GS); Stage 2 (Release 16)", Aug. 2020.

CMCC, Slice Impact on Multi-Connectivity, 3GPP TSG-RAN WG3 #97 R3-173144, Aug. 25, 2017.

Nokia, Nokia Shanghai Bell, NEC, Telecom Italia, Huawei, Interdigital, AT & T, Verizon, Sprint, Orange, China Mobile, NSSAI in access Stratum, 3GPP TSG SA WG2 #129 S2-1810389, Oct. 15-19, 2018.

Huawei, Hisilicon, Network slicing for E-UTRA connected to 5GC, 3GPP TSG RAN WG2 #99 R2-1708402, Aug. 25, 2017.

Intel, Key Issue #7, new solution: RAN Assisted Allowed NSSAI Generation, 3GPP TSG SA WG2 #140e S2-2005309, Sep. 2, 2020.

IN Office Action for Indian Patent Application No. 202317027644, mailed on Aug. 30, 2024.

* cited by examiner

UE, CORE NETWORK NODE, ACCESS NETWORK NODE, AMF APPARATUS, TERMINAL, AND METHOD THEREFOR

This application is a National Stage Entry of PCT/JP2021/037263 filed on Oct. 8, 2021, which claims priority from Japanese Patent Application 2020-174586 filed on Oct. 16, 2020, the contents of all of which are incorporated herein by reference, in their entirety.

TECHNICAL FIELD

The present disclosure relates to radio communication networks, and in particular to network slicing.

BACKGROUND ART

The 5G system (5GS) supports network slicing. Network slicing makes it possible to create multiple logical networks or non-virtualized logical networks on top of physical networks. For example, network slicing may use Network Function Virtualization (NFV) and software-defined networking (SDN) technologies to create multiple virtualized logical networks on top of physical networks. Each logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (one or both of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra-Reliable and Low-Latency Communication (URLLC), Massive Internet of Things (MIoT), and Vehicle to Everything (V2X) slice types. Anon-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

There are two types of S-NSSAI, which are known as S-NSSAI and Mapped S-NSSAI. An S-NSSAI identifies a network slice provided by the serving Public Land Mobile Network (PLMN) to which a UE is connected. Thus, when the UE is in its home network, an S-NSSAI identifies a network slice in the home network (e.g., Home PLMN (HPLMN)). During roaming, an S-NSSAI identifies a network slice of the roaming network (e.g., Visited PLMN (VPLMN)). A Mapped S-NSSAI may be an S-NSSAI of the Home PLMN (HPLMN) that is mapped to (or is associated with, or corresponds to) an S-NSSAI identifying a network slice of the roaming network when the UE is roaming, and may also be an S-NSSAI included in the UE user's subscription information among them.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSI, for this UE.

An allowed NSSAI is provided to a UE by a Serving PLMN and indicates one or more S-NSSAIs that the UE can use in the current registration area (RA) of the Serving PLMN. The Allowed NSSAI is determined by an AMF of the Serving PLMN, for example, during a registration procedure. The Allowed NSSAI is signaled to the UE by the network (i.e., AMF) and stored in memories (e.g., non-volatile memories) of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area (RA). If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in memories of both the AMF and the UE.

A Pending NSSAI indicates one or more S-NSSAIs for which Network Slice-Specific Authentication and Authorization (NSSAA) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead them in the Pending NSSAI. The Pending NSSAI is signaled to the UE by the network (i.e., AMF) and stored in memories of both the AMF and the UE.

The 3rd Generation Partnership Project (3GPP) is studying enhancements to network slices for Release 17. In addition, the 3GPP Technical Specification Group Services and System Aspects (TSG-SA) Working Group 1 (WG1) has approved a new working/study item for Release 18 to investigate the feasibility of Enhanced Access to and Support of Network Slice (see Non-Patent Literature 1). One of the objectives of this study item is to identify various deployment and usage scenarios of network slices, when there is a restriction of network slice to e.g., certain frequency bands/sub bands, RATs, geographical areas, networks and applications. Another one of the objectives of this study item is to identify various deployment and usage scenarios of network slices, when a User Equipment (UE) has a subscription to multiple network slices and these network slices are deployed for e.g., different frequency bands/sub bands, RATs, geographical area and applications.

CITATION LIST

Non Patent Literature

[Non-Patent Literature 1]3GPP SA WG1, "New WID on Study on Enhanced Access to and Support of Network Slice (from S1-202284)", SP-200571, 3GPP TSG SA Meeting #88e, Electronic Meeting, Jun. 30-Jul. 3, 2020

[Non-Patent Literature 2] 3GPP TS 23.502 V16.5.1 (2020-08) "3rd Generation Partnership Project; Technical Specification Group Services and System Aspects; Procedures for the 5G System (5GS); Stage 2 (Release 16)", August 2020

SUMMARY OF INVENTION

Technical Problem

At present, it is not clear how a UE and a network deal with various restrictions on the use of network slices (e.g., restrictions related to frequency bands, geographic areas, or applications). For example, it is not clear how a core network performs registration management of a UE based on restrictions on the use of network slices.

One of the objects to be attained by embodiments disclosed herein is to provide apparatuses, methods, and programs that contribute to achieving registration management adapted to various restrictions on the use of network slices. It should be noted that this object is merely one of the objects to be attained by the embodiments disclosed herein. Other objects or problems and novel features will be made apparent from the following description and the accompanying drawings.

Solution to Problem

In a first aspect, a UE includes at least one memory and at least one processor coupled to the at least one memory. The at least one processor is configured to send, via an access network, a first registration request message requesting registration to a core network to a core network node for mobility management in the core network, and receive a first registration accept message from the core network node via the access network. The first registration accept message contains a list of at least one allowed network slice identifier that is available for use by the UE in a current registration area. The first registration accept message further contains first slice restriction information, indicating whether there is a restriction on the use of a network slice identified by each allowed network slice identifier and a description of the restriction.

In a second aspect, a core network node for mobility management includes at least one memory and at least one processor coupled to the at least one memory. The at least one processor is configured to receive, via an access network, a first registration request message requesting registration to a core network from a User Equipment (UE), and send a first registration accept message to the UE via the access network. The first registration accept message contains a list of at least one allowed network slice identifier that is available for use by the UE in a current registration area. The first registration accept message further contains first slice restriction information, indicating whether there is a restriction on the use of a network slice identified by each allowed network slice identifier and a description of the restriction.

In a third aspect, a method performed by a UE includes: sending, via an access network, a first registration request message requesting registration to a core network to a core network node for mobility management in the core network; and receiving a first registration accept message from the core network node via the access network. The first registration accept message contains a list of at least one allowed network slice identifier that is available for use by the UE in a current registration area. The first registration accept message further contains first slice restriction information, indicating whether there is a restriction on the use of a network slice identified by each allowed network slice identifier and a description of the restriction.

In a fourth aspect, a method performed by a core network node for mobility management includes: sending, via an access network, a first registration request message requesting registration to a core network to a core network node for mobility management in the core network; and receiving a first registration accept message from the core network node via the access network. The first registration accept message contains a list of at least one allowed network slice identifier that is available for use by the UE in a current registration area. The first registration accept message further contains first slice restriction information, indicating whether there is a restriction on the use of a network slice identified by each allowed network slice identifier and a description of the restriction.

In a fifth aspect, a UE includes at least one memory and at least one processor coupled to the at least one memory. The at least one processor is configured to receive control information broadcast in a cell of an access network. The control information includes a list of at least one network slice identifier, and further includes slice restriction information indicating whether there is a restriction on use of a network slice identified by each of the at least one network slice identifier and a description of the restriction.

In a sixth aspect, an access network (AN) node includes at least one memory and at least one processor coupled to the at least one memory. The at least one processor is configured to broadcast control information in a cell. The control information includes a list of at least one network slice identifier, and further includes slice restriction information indicating whether there is a restriction on use of a network slice identified by each of the at least one network slice identifier and a description of the restriction.

In a seventh aspect, a method performed by a UE includes receiving control information broadcast in a cell of an access network. The control information includes a list of at least one network slice identifier, and further includes slice restriction information indicating whether there is a restriction on use of a network slice identified by each of the at least one network slice identifier and a description of the restriction.

In an eighth aspect, a method performed by an AN node includes broadcasting control information in a cell. The control information includes a list of at least one network slice identifier, and further includes slice restriction information indicating whether there is a restriction on use of a network slice identified by each of the at least one network slice identifier and a description of the restriction.

In a ninth aspect, an access network (AN) node includes at least one memory and at least one processor coupled to the at least one memory. The at least one processor is configured to maintain slice restriction information. The at least one processor is configured to receive, in a Radio Resource Control (RRC) connection establishment procedure, an RRC Setup Complete message from a User Equipment (UE), the RRC Setup Complete message containing an Access Stratum (AS) parameter, including at least one network slice identifier, and a Non-Access Stratum (NAS) message. Further, the at least one processor is configured to stop forwarding the NAS message to a core network if the slice restriction information indicates that there is a restriction on use of the at least one network slice identifier contained in the AS parameter.

In a tenth aspect, a method performed by an AN node includes the steps of:

(a) maintaining slice restriction information;

(b) receiving, in a Radio Resource Control (RRC) connection establishment procedure, an RRC Setup Complete message from a User Equipment (UE), the RRC Setup Complete message containing an Access Stratum (AS) parameter, including at least one network slice identifier, and a Non-Access Stratum (NAS) message; and (c) stopping forwarding the NAS message to a core network if the slice restriction information indicates that there is a restriction on use of the at least one network slice identifier contained in the AS parameter.

In an eleventh aspect, a program includes a set of instructions (software codes) that, when loaded into a computer, cause the computer to perform the method according to the third, fourth, seventh, eighth, or tenth aspect described above.

ADVANTAGEOUS EFFECTS OF INVENTION

According to the above-described aspects, it is possible to provide apparatuses, methods, and programs that contribute to achieving registration management adapted to various restrictions on the use of network slices.

EXAMPLE EMBODIMENT

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP fifth generation mobile communication system (5G system (5GS)). However, these embodiments may be applied to other cellular communication systems that support network slicing as well as 5GS.

First Embodiment

Figure 1:
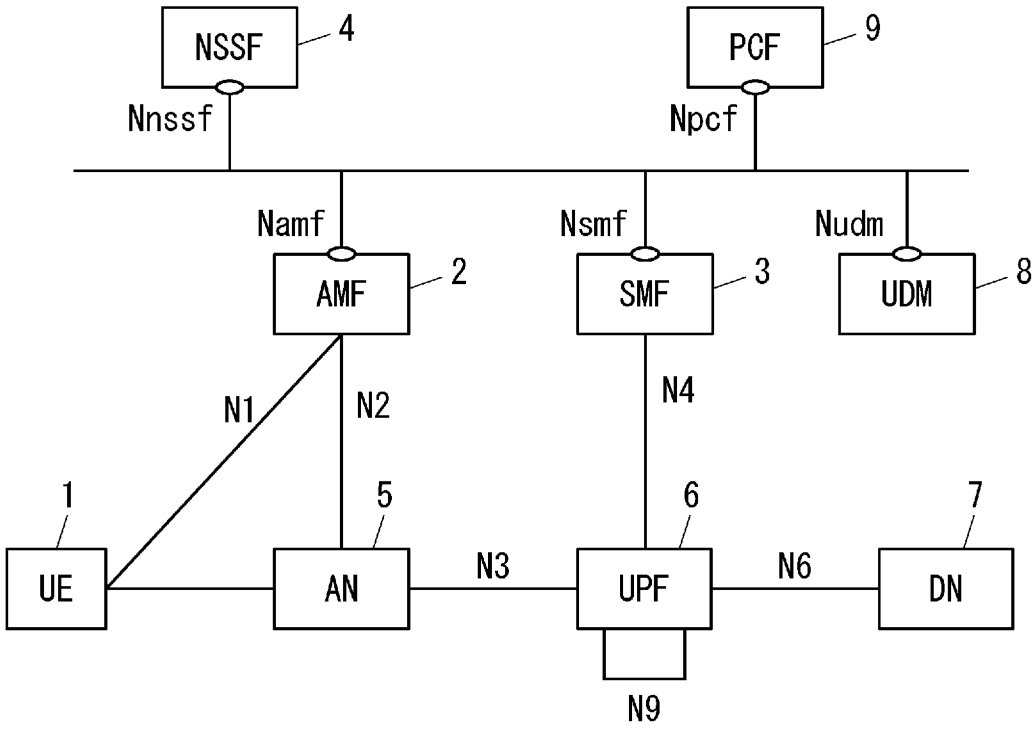
FIG. 1 shows an example configuration of a communication network according to an embodiment.

FIG. 1 shows an example configuration of a communication network (i.e., 5GS) according to this embodiment. Each of the elements shown in FIG. 1 is a network function and provides an interface as defined by the 3rd Generation Partnership Project (3GPP). Each of the elements (network functions) shown in FIG. 1 can be implemented, for example, as a network element on dedicated hardware, as a software instance running on dedicated hardware, or as a virtual function instantiated on an application platform.

The cellular network shown in FIG. 1 may be provided by a Mobile Network Operator (MNO), or it may be a Non-Public Network (NPN) provided by a non-MNO. If the cellular network shown in FIG. 1 is an NPN, it may be an independent network, represented as a Stand-alone Non-Public Network (SNPN), or it may be an NPN linked to an MNO network, represented as a public network integrated NPN (PNI-NPN).

A radio terminal (i.e., UE) 1 communicates with a data network (DN) 7 using the 5G connectivity service. More specifically, the UE 1 is connected to an access network (i.e., 5G Access Network (SGAN)) 5 and communicates with the data network (DN) 7 via a User Plane Function (UPF) 6 in a core network (i.e., 5G core network (5GC)). The AN 5 may include a Next Generation Radio Access Network (NG-RAN) or a non-3GPP AN, or both. The Non-3GPP AN may be a network that handles wireless LAN (WiFi) communication or a network that handles wired communication, known as a Wireline 5G Access Network (W-SGAN). The UPF 6 may include multiple UPFs that are interconnected.

The UE 1 establishes one or more Protocol Data Unit (PDU) Sessions between the UE 1 and the UPF 6 (i.e., PDU session anchor) to which the DN 7 is connected. A PDU Session is an association, session, or connection between a UE and a DN, and is used to provide a PDU connectivity service (i.e., an exchange of PDUs between UE 1 and DN 7). From a data transfer perspective, a PDU Session consists of a tunnel within the 5GC (N9 tunnel), a tunnel between the 5GC and the AN 5 (N3 tunnel), and one or more radio bearers. Although not shown in FIG. 1, the UE 1 may establish multiple PDU Sessions with multiple UPFs (PDU session anchors) 6 to access multiple DNs 7 concurrently.

The AMF 2 is a network function within the 5GC Control Plane. The AMF 2 provides termination of a (R)AN Control Plane (CP) interface (i.e., N2 interface). The AMF 2 terminates a single signalling connection (i.e., NAS signalling connection) with the UE 1 and provides registration management, connection management, and mobility management. The registration management is used to register or deregister the UE 1 in the network (5G system). The connection management is used to establish and release the NAS signaling connection between the UE 1 and the AMF 2. The mobility management is used to keep track of the location of the UE 1. The mobility management uses a periodic registration update procedure and a mobility registration update procedure. Accordingly, in the 5G System, it can be said that the mobility management is part of the registration management.

The AMF 3 provides NF services on a service-based interface (i.e., Namf interface) to NF consumers (e.g., other AMFs, and Session Management Function (SMF) 3). The NF services provided by the AMF 2 include a communication service (Namf_Communication). The communication service allows NF consumers (e.g., SMF 3) to communicate with the UE 1 or the AN 5 via the AMF 2. In addition, AMF 22 utilizes NF services provided by other NFs (e.g., Network Slice Selection Function (NSSF) 4 and Unified Data Management (UDM) 8).

The SMF 3 is a network function within the 5GC Control Plane. The SMF 3 provides session management. The session management is used to establish, modify, and release a PDU Session in order to provide a PDU Connectivity Service to the UE 1. The session management includes signaling with the UE 1, AMF 2, and UPF 6 for the establishment, modification, and release of a PDU Session.

The SMF 3 sends and receives Session Management (SM) signaling messages (NAS-SM messages, N1 SM messages) to and from the Non-Access-Stratum (NAS) SM layer of the UE 1. The SMF 3 provides NF services on a service-based interface (i.e., Nsmf interface) to NF consumers (e.g., AMF 2, other SMFs). The NF services provided by the SMF 3 include session management services (Nsmf_PDUSession). This NF Service allows NF Consumers (e.g., AMF 2) to handle PDU Sessions. The SMF 3 may be an Intermediate SMF (I-SMF), which is inserted between the AMF 2 and the original SMF as needed when the UPF 6 belongs to a different SMF service area and cannot be controlled by the original SMF.

The NSSF 4 is a network function within the 5GC Control Plane. The AMF 2 or the NSSF 4 determines a mapping of Configured NSSAI for the Serving PLMN (i.e., VPLMN) to HPLMN Subscribed S-NSSAI(s). In addition, the AMF 2 or the NSSF 4 determines a mapping of Allowed NSSAI for the Serving PLMN (i.e., VPLMN) to HPLMN Subscribed S-NSSAI(s). The Configured NSSAI is provisioned in the UE 1 by the serving PLMN (i.e., VPLMN) during a Registration procedure or a UE Configuration Update procedure. The Configured NSSAI includes at least one S-NSSAI, each of which is applicable to at least one PLMN. On the other hand, the Allowed NSSAI indicates at least one S-NSSAI that the UE 1 can use in the current Registration Area of the serving PLMN (i.e., VPLMN). The Allowed NSSAI is provisioned within the UE 1 by the serving PLMN (i.e., VPLMN), e.g., during a registration procedure.

The UDM 8 is a network function within the 5GC Control Plane. The UDM 8 provides access to a database (i.e., User Data Repository (UDR)) containing subscriber data (or subscription information). The UDM 8 provides NF services on a service-based interface (i.e., Nudm interface) to NF consumers (e.g., AMF 2 and SMF 3). The NF services provided by the UDM 8 include subscriber data management services. This NF service enables NF consumers (e.g., AMF 2) to retrieve subscriber data and provides updated subscriber data to NF consumers.

The network function that stores subscriber data (or subscription information) may be the UDM 8 or the UDR. If the network operator's network design or operating policy uses a split architecture that separates data management and data repository, then the UDR may be used to store subscriber data. On the other hand, if the split architecture is not used, the UDM 8 may be used to store subscriber data. In this specification, the network function that stores subscriber data may be the UDM 8 or the UDR.

A Policy Control Function (PCF) 9 is a network function within the 5GC Control Plane. The PCF 9 supports interactions with access and mobility policy enforcement within the AMF 2 via a service-based interface. The PCF 9 provides access and mobility management related policies to the AMF 2.

The example configuration in FIG. 1 shows only some major NFs for illustrative purposes. The cellular network according to this embodiment may include other NFs not shown in FIG. 1, such as Authentication Server Function (AUSF).

A registration procedure according to this embodiment is described below. The registration procedure in the 5GS is used, for example, for initial registration and mobility registration update. The UE 1 uses the initial registration to connect to the network (5GC) after power-on. The UE 1 uses the mobility registration update when it moves out of its current registration area (RA) or when it needs to update its capabilities or other parameters negotiated in the registration procedure.

Figure 2:
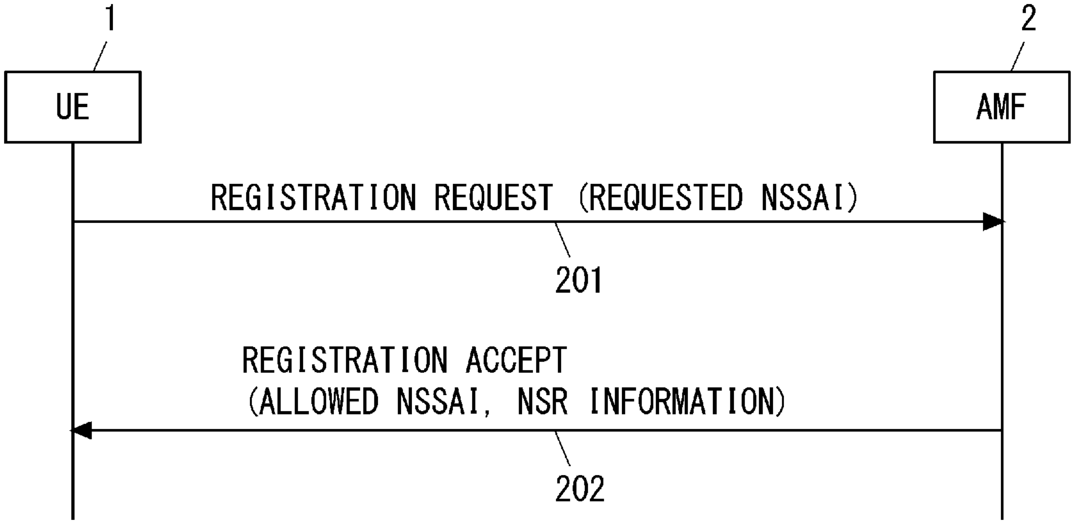
FIG. 2 is a sequence diagram showing an example of operations of a UE and an AMF according to an embodiment.

FIG. 2 shows an example of the signaling between the UE 1 and the AMF 2 that takes place during the registration procedure. In step 201, the UE 1 sends a Registration Request message to the AMF 2 via the AN 5. The Registration Request message includes Requested NSSAI. More specifically, if the AN 5 is an NG-RAN, the UE 1 sends a Radio Resource Control (RRC) Setup Complete message containing the Registration Request message to an AN node (e.g., gNB) in the AN 5. The UE 1 further includes the NSSAI (i.e., Requested NSSAI) for network slice selection in that RRC Setup Complete message as one of the AN parameters. The AN node selects the AMF 2 based on the NSSAI in the AN parameters and forwards the registration request message to the AMF 2.

In step 202, in response to the Registration Request message, the AMF 2 sends a Registration Accept message to the UE 1 via the AN 5. The registration accept message indicates a registration area (RA) for the UE 1, which includes one or more Tracking Areas (TAs). One TA contains one or more cells. In addition, the registration accept message includes Allowed NSSAI, which is a list of one or more S-NSSAIs that are allowed for the UE 1. Essentially, each S-NSSAI in the Allowed NSSAI is available throughout the registration area of the UE 1. However, in this embodiment, if there are restrictions on the use of the network slice identified by each S-NSSAI, UE 1 may not be able to use that S-NSSAI even within the current registration area.

The registration accept message of step 202 further includes Network Slice Restriction (NSR) information. The NSR information indicates whether there are any restrictions on the use of the network slice identified by each S-NSSAI included in the Allowed NSSAI. In addition, if there is any restriction on the use of the network slice, the NSR information indicates a description of that restriction. Restrictions on the use of a network slice may include at least one of: a restriction on radio frequencies (e.g., frequency bands or sub-bands) with which the network slice is available, a restriction on radio access technologies with which the network slice is available, a restriction on geographic areas in which the network slice is available, a restriction on applications with which the network slice is available, or a restriction based on priorities among multiple network slices.

In one example, the NSR information indicates that a given S-NSSAI is available only in one or more specific frequency bands or is not available in one or more specific frequency bands. In one example, the NSR information indicates that a given S-NSSAI is available only in one or more specific RATs or is not available in one or more specific RATs. In one example, the NSR information indicates that a given S-NSSAI is available only in one or more specific geographic areas or is not available in one or more specific geographic areas. Each geographic area may be a tracking area or a cell. In one example, the NSR information indicates that a given S-NSSAI is available only for one or more specific applications (or services) or is not available for one or more specific applications (or services). In one example, the NSR information indicates that there are priorities among multiple network slices (or S-NSSAIs) allowed for the UE 1. For example, when the UE 1 is using a network slice given a higher priority by the NSR information, the UE 1 may recognize that network slices of lower priority cannot be used at the same time. Alternatively, the NSR information may indicate that a given network slice (or S-NSSAI) cannot be used simultaneously with another network slice.

The AMF 2 may send new NSR information to the UE 1 at other times to change the NSR information that has already been sent to the UE 1. In that case, the AMF 2 may send the new NSR information to the UE 1 via a Configuration Update Command message in a UE Configuration Update procedure.

Figure 3:
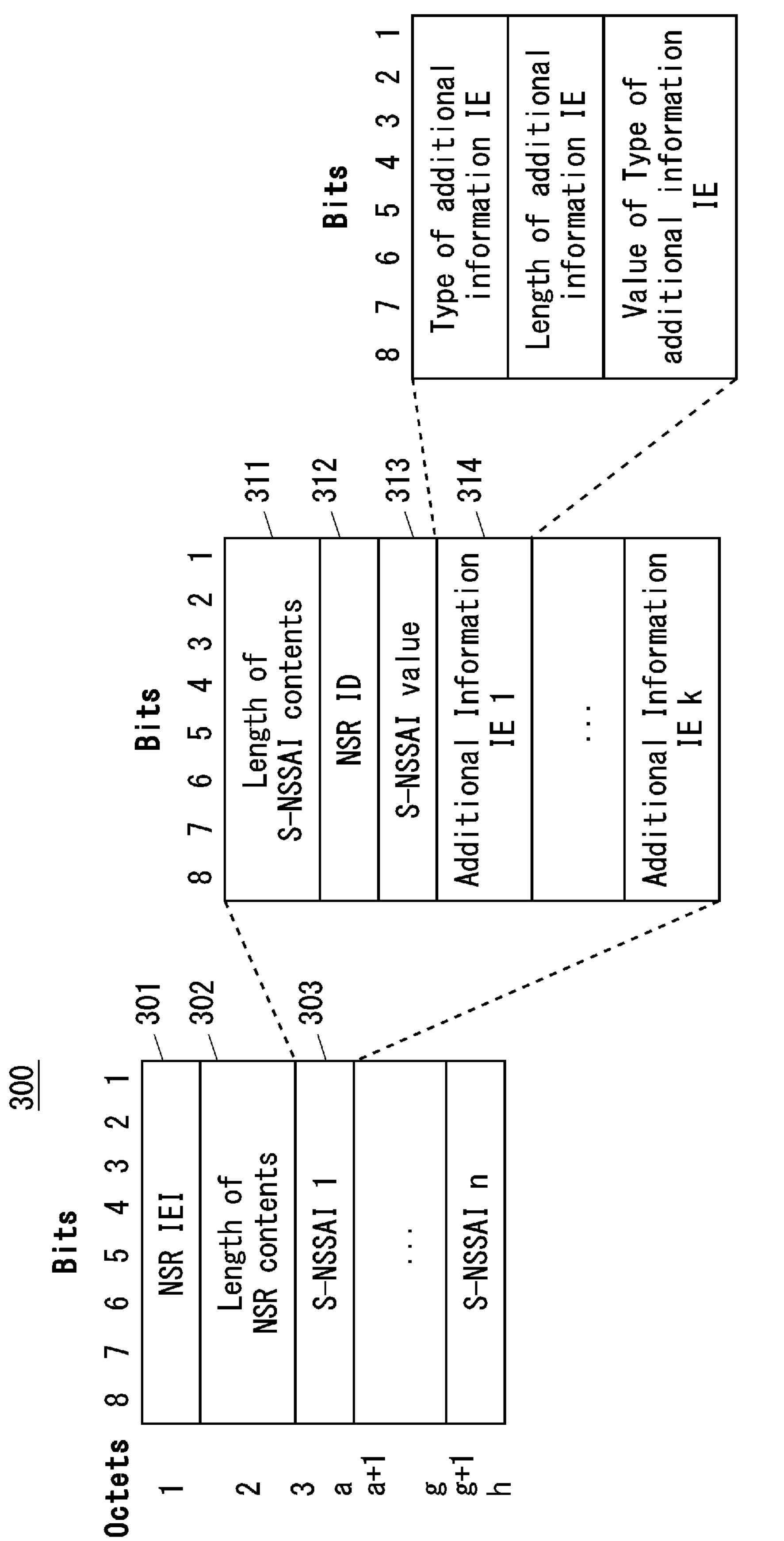
FIG. 3 shows an example format of network slice restriction (NSR) information according to an embodiment.

FIG. 3 shows an example of a format of the NSR information. In the example illustrated in FIG. 3, an NSR Information Element (IE) 300 includes an NSR IE Identifier (IEI) field 301, a Length of NSR contents field 302, and one or more S-NSSAI fields 303. The NSR IEI field 301 contains an identifier identifying the NSR IE 300. The Length of NSR contents field 302 indicates the length in octets of the contents included in the NSR IE 300.

Each S-NSSAI field 303 indicates one S-NSSAI and usage restrictions imposed thereon. Specifically, each S-NSSAI field 303 contains a Length of S-NSSAI contents field 311, an NSR ID field 312, an S-NSSAI value field 313, and one or more Additional information IE fields 314. The Length of S-NSSAI contents field 311 indicates the length in octets of the contents included in the S-NSSAI field 303. The NSR ID field 312 contains an identifier (i.e., NSR ID) indicating the type of network slice restriction. The S-NSSAI value field 313 indicates an S-NSSAI value. That is, the S-NSSAI indicated by the S-NSSAI value field 313 is subject to the network slice restriction indicated by the NSR ID field 312. In other words, the NSR ID field 312 and the S-NSSAI value field 313 associate an identifier of the restriction (NSR ID) with the S-NSSAI of the network slice in which this restriction is imposed. Each Additional information IE field 314 indicates the details of the network slice restriction indicated by the NSR ID field 312.

In some implementations, values 1 to 128 of the NSR ID may be operator-specific, and values 129 to 256 of the NSR ID may be predetermined reference values. In the first example, a specific NSR ID value (e.g., 129) may indicate a restriction regarding a geographic area. In this case, each Additional information IE field 314 may indicate a geographical area where the use of the network slice identified by the S-NSSAI value field 313 is allowed (or prohibited). Specifically, each Additional information IE field 314 may indicate geographical location data, a list of TAs, or a list of cells. These may be a subset of the TAs or cells contained in the current registration area of the UE 1.

In the second example, a specific NSR ID value (e.g., 130) may indicate a restriction related to radio frequencies. In this case, each Additional information IE field 314 may indicate one or more frequency bands in which the network slice identified by the S-NSSAI value field 313 is allowed (or prohibited) to be used. Specifically, each Additional information IE field 314 may indicate a list of Absolute Radio Frequency Channel Numbers (ARFCNs).

In the third example, a specific NSR ID value (e.g., 131) may indicate a restriction regarding RATs. In this case, each Additional information IE field 314 may indicate a RAT on which the network slice identified by the S-NSSAI value field 313 is allowed (or prohibited) to be used.

In the fourth example, a specific NSR ID value (e.g., 132) may indicate a restriction regarding priorities among multiple network slices. In this case, each Additional information IE field 314 may indicate the priority of the network slice identified by the S-NSSAI value field 313, or may indicate that it is not allowed to be used concurrently with another (specific) network slice.

Figure 4:
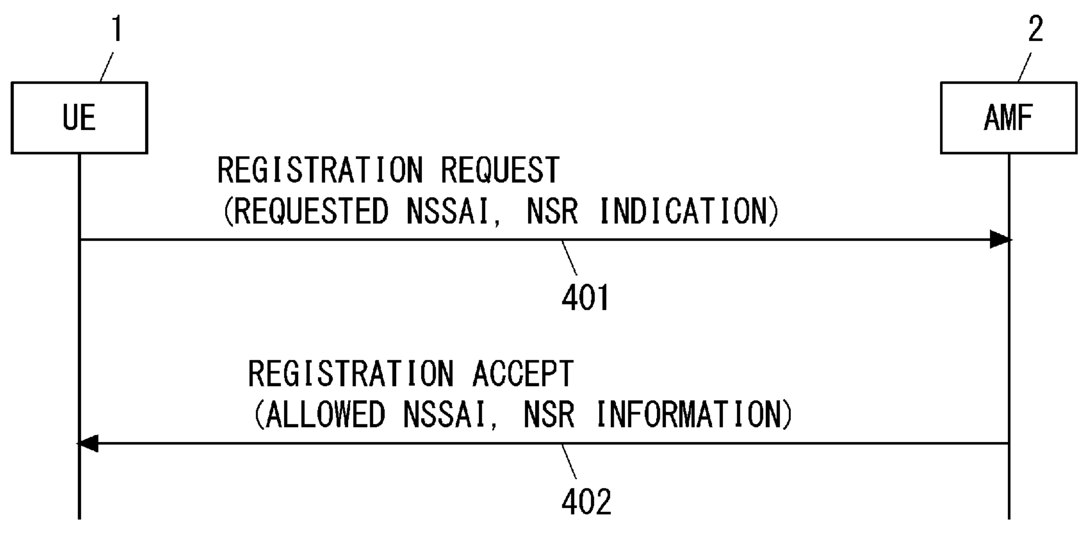
FIG. 4 is a sequence diagram showing an example of operations of a UE and an AMF according to an embodiment.

FIG. 4 shows a modification of the signaling shown in FIG. 2. In some implementations, the UE 1 may include a request (e.g., NSR INDICATION) for network slice restriction (NSR) information in the registration request message (step 401). The request (e.g., NSR INDICATION) may be an indication or capability information indicating support for NSR. The AMF 2 may include NSR information in the registration accept message (step 402) in response to determining that the registration request message contains a request for NSR information (e.g., NSR INDICATION). This procedure allows the AMF 2 to know whether or not the UE 1 supports NSR. Therefore, the AMF 2 can operate to configure the UE 1 with the NSR information only if the UE 1 supports NSR.

In addition, AN nodes (e.g., gNBs) deployed in the AN 5 may broadcast in cells an indication of network deployment with NSR restrictions imposed. This indication may be included in System Information (System Information Block (SIB)). System information, including the indication, may be provided to the UE 1 via periodic broadcasts or may be provided to the UE 1 on an on-demand basis. When the UE 1 sends a registration request message through a cell in which it has received broadcast information containing the indication, the UE 1 may include a request for NSR information in that registration request message.

Figure 5:
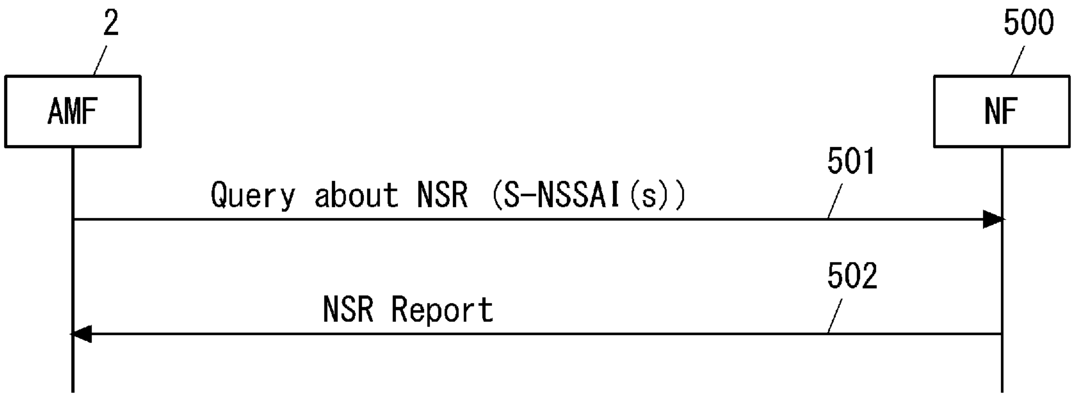
FIG. 5 is a sequence diagram showing an example of operations of an AMF and another NF according to an embodiment.

FIG. 5 shows a modification of the signaling shown in FIG. 2. In some implementations, the AMF 2 may receive NSR information from another Network Function (NF) 500. The NF 500 may be the NSSF 4, UDM 8, PCF 9, or UDR described above. The NF 500 may be another existing NF in the 5GC, e.g., Network Data Analytics Function (NWDAF). Alternatively, the NF 500 may be a new network function in the SGC. In step 501, the AMF 2 queries the NF 500 for NSR information. In step 502, the AMF 2 receives a report (e.g., NSR report) containing the NSR information from the NF 500.

Figure 6:
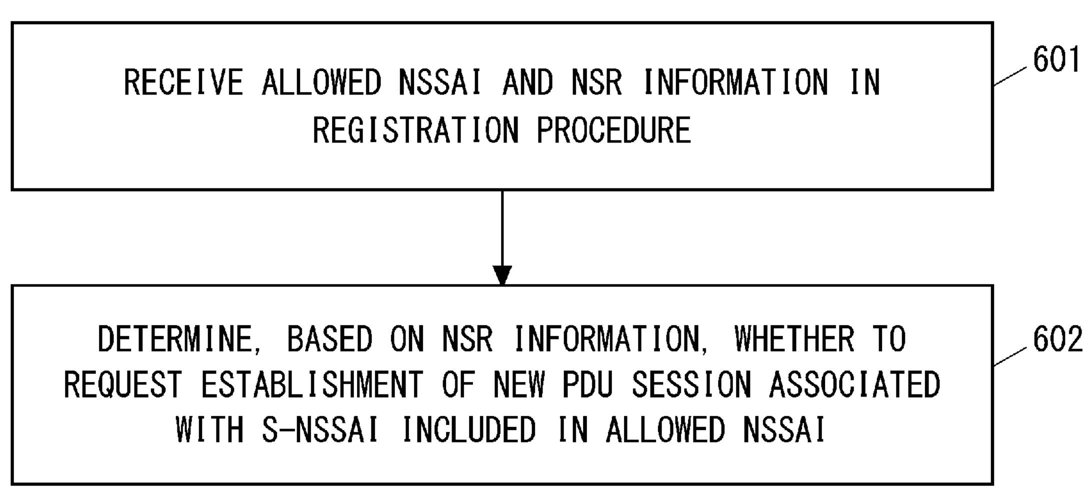
FIG. 6 is a flowchart showing an example of an operation of a UE according to an embodiment.

The following provides a specific example of the behavior of the UE 1 after receiving the NSR information from the AMF 2. FIG. 6 shows an example of the operation of the UE 1. In step 601, the UE 1 receives Allowed NSSAI and NSR information in a registration procedure. In step 602, the UE 1 determines, based on the NSR information, whether to request the core network to establish a new PDU Session associated with an S-NSSAI included in the Allowed NSSAI. In other words, the UE 1 uses the NSR information to determine whether or not to send a PDU Session Establishment Request message. In one example, as already described, the NSR information may indicate that the use of a particular S-NSSAI is allowed (or prohibited) within a specific geographic area. In this case, if the current location of the UE 1 is within that specific geographic area, the UE 1 requests (or stops requesting) the core network to establish a new PDU Session associated with that particular S-NSSAI. The UE 1 may perform a similar action if the NSR information indicates other restrictions (e.g., frequency band, RAT, application, or priority restrictions).

Figure 7:
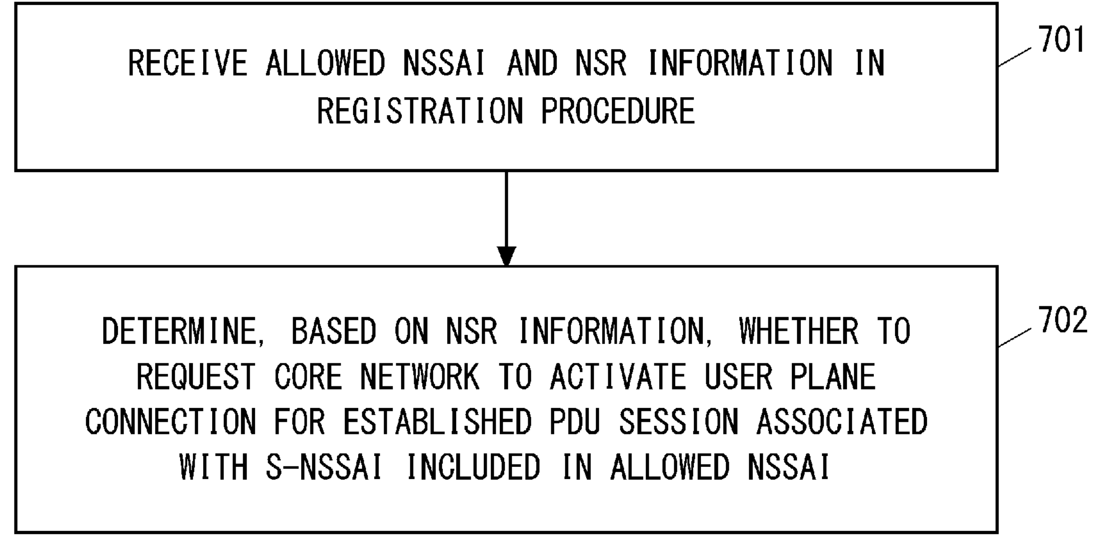
FIG. 7 is a flowchart showing an example of an operation of a UE according to an embodiment.

FIG. 7 shows another example of the operation of the UE 1. In step 701, the UE 1 receives Allowed NSSAI and NSR information in a registration procedure. In step 702, the UE 1 determines, based on the NSR information, whether to request the core network to activate a user plane connection for the established PDU Session associated with the S-NSSAI included in the Allowed NSSAI. In other words, the UE 1 uses the NSR information to determine whether or not to send a Service Request message to request activation of the user plane connection for the established PDU Session. In one example, as already described, the NSR information may indicate that the use of a particular S-NSSAI is allowed (or prohibited) within a specific geographic area. In this case, if the current location of the UE 1 is within that specific geographic area, the UE 1 requests (or stops requesting) the core network to activate the user plane connection for the established PDU Session associated with that particular S-NSSAI. The UE 1 may perform a similar action if the NSR information indicates other restrictions (e.g., frequency band, RAT, application, or priority restrictions).

As understood from the above description, in this embodiment, the AMF 2 configures UE 1 with NSR information in addition to Allowed NSSAI. The UE 1 then determines the availability of each S-NSSAI included in the Allowed NSSAI based on the NSR information. This allows more detailed control of the use of network slices by the UE 1 within the registration area of the UE 1.

Second Embodiment

This embodiment provides a modification of the first embodiment. An example configuration of a communication network according to this embodiment is the same as the example described with reference to FIG. 1.

The AMF 2 sends NSR information to the UE 1 in the same way as in the first embodiment. Further, in this embodiment, the AMF 2 sends to the UE 1 one or both of a first NSR list of NSR(s) to be imposed on the UE 1 and a second NSR list of NSR(s) that are not imposed on the UE 1. More specifically, in this embodiment, each NSR contained in the NSR information is commonly applied to multiple UEs. In contrast, the first and second NSR lists are UE-specific and control whether each NSR contained in the NSR information is applied to each UE. The first NSR list may indicate one or more NSR IDs that the UE 1 needs to follow. The first NSR list may be referred to, for example, as a non-allowed NSR list, enforced NSR list, imposed NSR list, valid NSR list, or activated NSR list. On the other hand, the second NSR list may indicate one or more NSR IDs that the UE 1 may not have to follow. The second NSR list may be referred to, for example, as an allowed NSR list, permitted NSR list, invalid NSR list, or deactivated NSR list.

Figure 8:
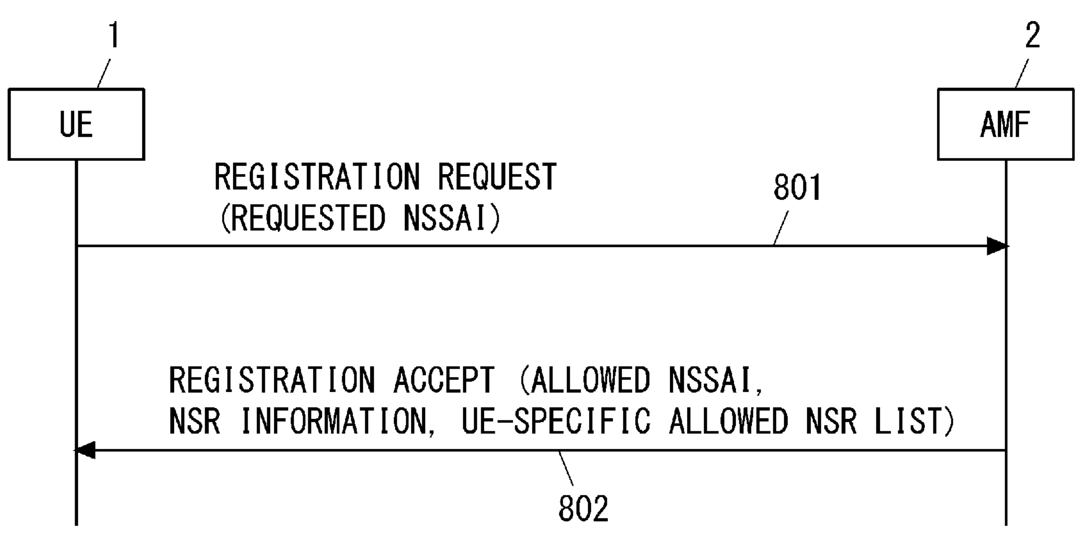
FIG. 8 is a sequence diagram showing an example of operations of a UE and an AMF according to an embodiment.

FIG. 8 shows an example of the signaling between the UE 1 and the AMF 2 that takes place during a registration procedure. In step 801, the UE 1 sends a Registration Request message to the AMF 2 via the AN 5. The Registration Request message contains Requested NSSAI. As described in the first embodiment, the UE 1 may include a request for network slice restriction (NSR) information (e.g., NSR INDICATION) in the Registration Request message. This request (e.g., NSR INDICATION) may be an indication or capability information indicating support for NSR. In addition, an AN node (e.g., gNB) located in the AN 5 may broadcast in a cell an indication of a network deployment in which NSR restrictions have been imposed. The UE 1 may include a request for NSR information in the registration request message when it sends a registration request message through a cell in which it has received broadcast information containing that indication.

In step 802, in response to the Registration Request message, the AMF 2 sends a Registration Accept message to the UE 1 via the AN 5. The registration accept message contains Allowed NSSAI. The registration accept message also contains NSR information. In addition, the registration accept message contains the first NSR list or the second NSR list or both, as described above.

Step 802 shows an example where one or both of the first and second NSR lists are sent to the UE 1 in the same NAS message (Registration Accept message) as the NSR information. Alternatively, one or both of the first and second NSR lists may be sent to the UE 1 in a different NAS message than that transmitting the NSR information. For example, the AMF 2 may send one or both of the first and second NSR lists to the UE 1 during the initial registration of the UE 1. In a subsequent mobility registration update or periodic registration update, the AMF 2 may send the NSR information to UE 1. Alternatively, the AMF 2 may send the NSR information to the UE 1 during the initial registration of the UE 1. In a subsequent UE Configuration Update procedure, the AMF 2 may send one or both of the first and second NSR lists to the UE 1. Step 901 in FIG. 9 shows an example of a UE Configuration Update procedure in which the AMF 2 sends one or both of the first and second NSR lists (e.g., UE-specific allowed NSR list) to the UE 1 via a Configuration Update Command message.

Figure 9:
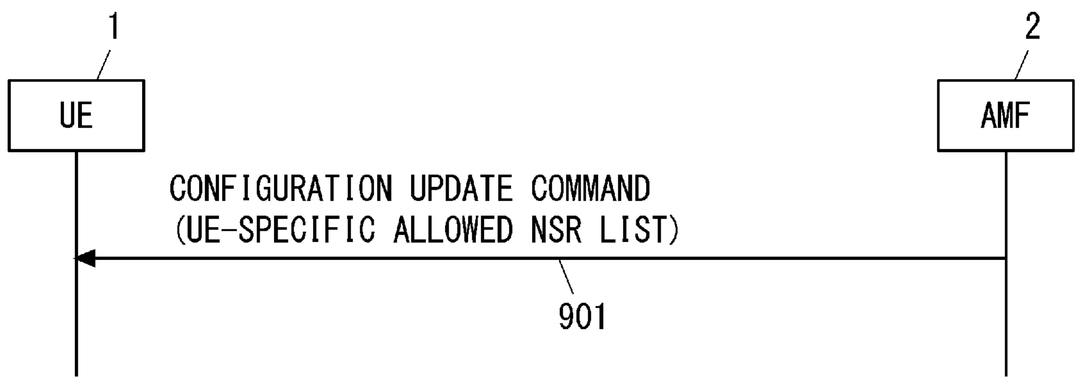
FIG. 9 is a sequence diagram showing an example of operations of a UE and an AMF according to an embodiment.
Figure 10:
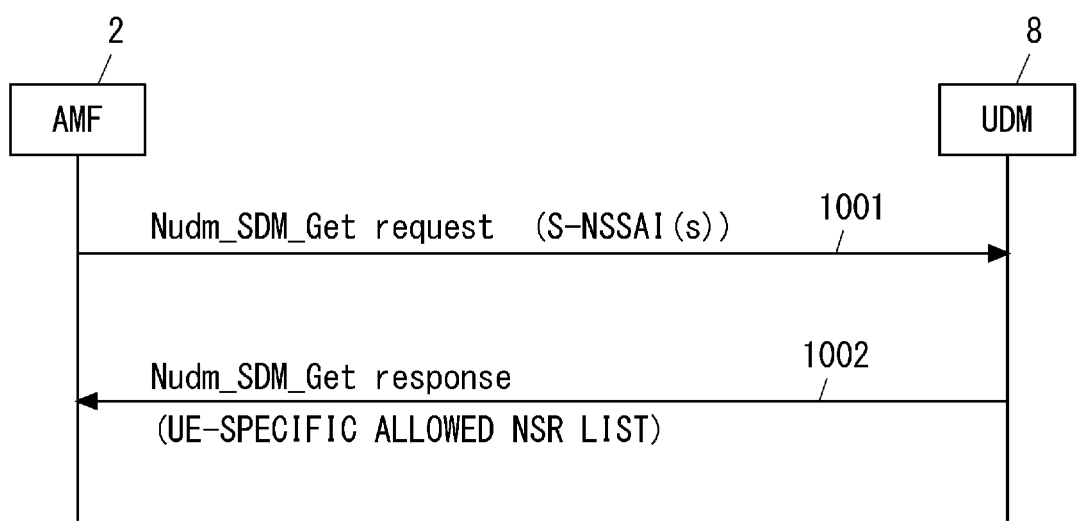
FIG. 10 is a sequence diagram showing an example of operations of an AMF and a UDM according to an embodiment.

FIG. 10 shows a modification of the signaling shown in FIGS. 8 and 9. In some implementations, one or both of the first and second NSR lists may be included in the subscription information of the UE 1. In this case, the AMF 2 may receive one or both of the first and second NSR lists from the UDM 8. In step 1001, the AMF 2 queries the UDM 8 for the first and second NSR lists. In step 502, the AMF 2 receives one or both of the first and second NSR lists from the UDM 8. Alternatively, the AMF 2 may receive one or both of the first and second NSR lists from a different NF (e.g., NSSF, NWDAF, PCF, or other policy server) than the UDM 8.

Figure 11:
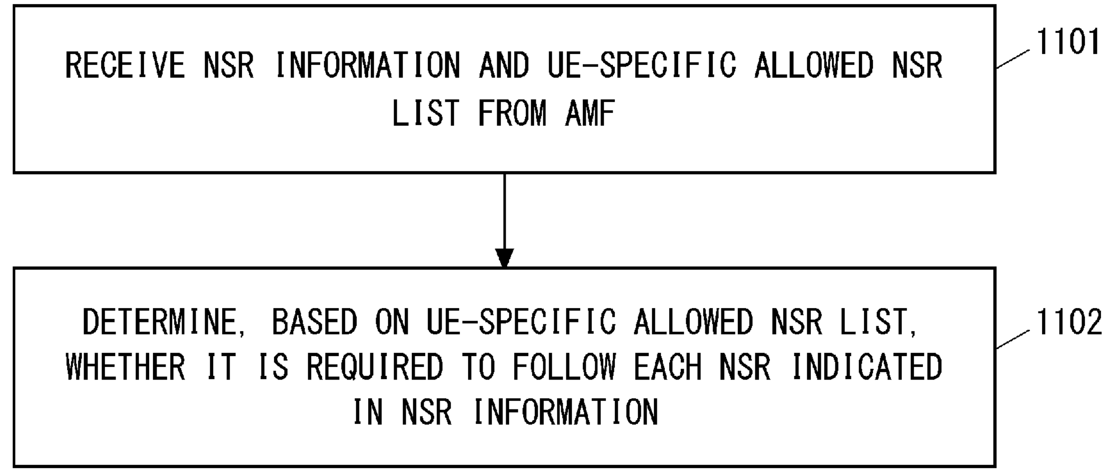
FIG. 11 is a flowchart showing an example of an operation of a UE according to an embodiment.

FIG. 11 shows an example of the operation of the UE 1. In step 1101, the UE 1 receives NSR information from the AMF 2 and further receives one or both of the first and second NSR lists (e.g., UE-specific allowed NSR list) from the AMF 2. As already described, the UE 1 may receive these in the same NAS message or in different NAS messages. In step 1102, the UE 1 determines whether it needs to follow each NSR indicated in the NSR information based on one or both of the first and second NSR lists (e.g., UE-specific allowed NSR list).

In some implementations, the UE 1 may not consider an NSR ID included in the NSR information if this NSR ID is also included in the second NSR list (e.g., UE-specific allowed NSR list, invalid NSR list). In other words, the UE 1 may ignore the NSR details associated with that NSR ID. Conversely, if an NSR ID contained in the NSR information is not included in the second NSR list, the UE 1 may determine whether the network slice is available according to the NSR details associated with that NSR ID. The operation of the UE based on the NSR information may be similar to the operation described in the first embodiment (e.g., FIG. 6 or FIG. 7).

Additionally or alternatively, if an NSR ID contained in the NSR information is also included in the first NSR list (e.g., UE-specific non-allowed NSR list, valid NSR list), the UE 1 may determine whether the network slice is available or not according to the NSR details associated with that NSR ID. The operation of the UE based on the NSR information may be similar to the operation described in the first embodiment (e.g., FIG. 6 or FIG. 7). Conversely, the UE 1 does not have to consider an NSR ID included in the NSR information if that NSR ID is not included in the first NSR list. In other words, UE 1 may ignore the NSR details associated with that NSR ID.

If an NSR ID included in the NSR information is not included in either the first NSR list (e.g., UE-specific non-allowed NSR list, valid NSR list) or the second NSR list (e.g., UE-specific allowed NSR list, invalid NSR list), the UE 1 may decide whether or not to consider that NSR ID based on a local policy configured in the UE 1. Alternatively, the UE 1 may determine whether the network slice can be used based on the NSR information, specifically according to the NSR details associated with that NSR ID, as in the operating example in the first embodiment.

As understood from the above description, in this embodiment, the AMF 2 provides the UE 1 with one or both of the UE-specific first and second NSR lists in addition to the NSR information. The first and second NSR lists may be included in the subscription information. The UE 1 then determines, based on one or both of the first and second NSR lists, whether it needs to follow each NSR indicated in the NSR information. This allows the operation based on the NSR information to be controlled on a per-UE basis.

Third Embodiment

This embodiment provides a modification of the first and second embodiments. An example configuration of a communication network according to this embodiment is similar to the example described with reference to FIG. 1.

Figure 12:
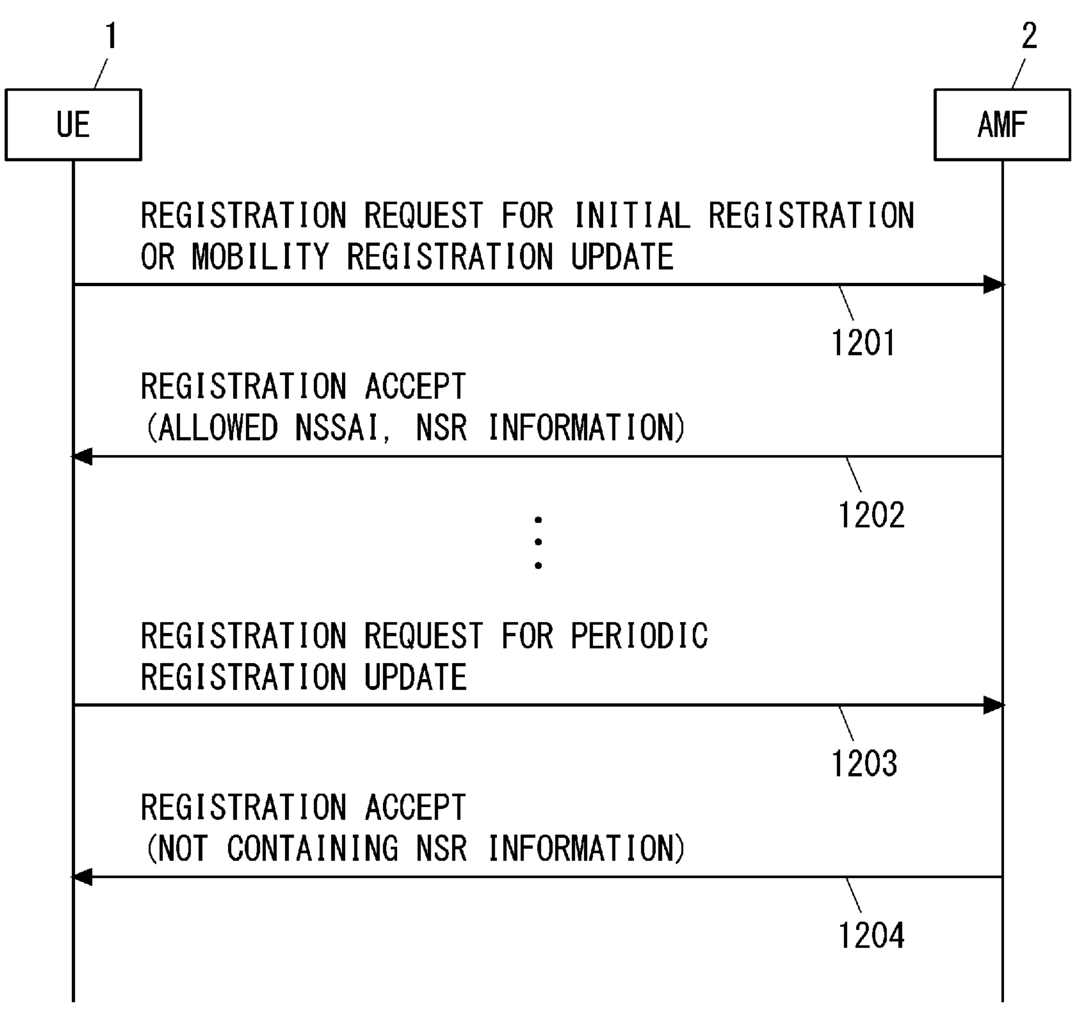
FIG. 12 is a sequence diagram showing an example of operations of a UE and an AMF according to an embodiment.

This embodiment provides the behavior of the UE 1 when NSR information received by the UE 1 in a registration accept message is different from the previous NSR information received in the previous registration accept message. FIG. 12 shows an example of the operation of the UE 1 and the AMF 2 according to this embodiment. Steps 1201 and 1202 show a registration procedure for initial registration or mobility registration update. Steps 1201 and 1202 are similar to steps 201 and 202 in FIG. 2. In step 1202, the UE 1 receives a registration accept message containing NSR information.

Steps 1203 and 1204 represent a registration procedure for a registration update performed after steps 1201 and 1202. This registration procedure may be performed for a periodic registration update or for a mobility registration update. In the case of a mobility registration update, the (New) AMF 2 in steps 1203 and 1204 may be different from the (Old) AMF 2 that provided the initial registration in steps 1201 and 1202. In step 1203, the UE 1 sends a registration request message to the AMF 2 for a periodic registration update. In step 1204, the AMF 2 sends a registration accept message. If the registration accept message in step 1204 does not contain NSR information, or if the contents of the NSR information in the registration accept message in step 1204 differs from that of the NSR information contained in the previous registration accept message, the UE 1 may operate as follows.

Figure 13:
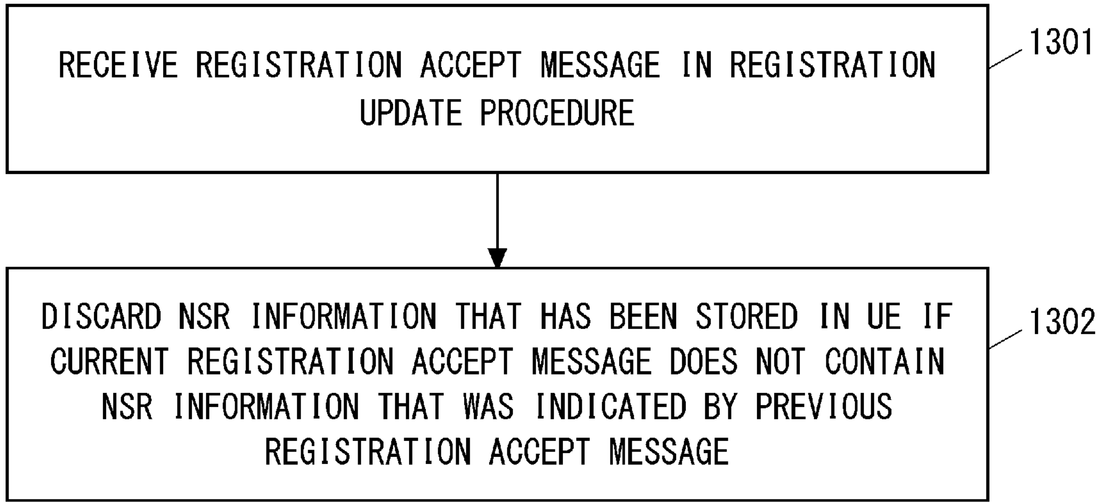
FIG. 13 is a flowchart showing an example of an operation of a UE according to an embodiment.

FIG. 13 shows an example of the operation of the UE 1. In step 1301, the UE 1 receives a registration accept message in a registration update procedure, which corresponds to step 1204 in FIG. 12. In step 1302, the UE 1 discards the NSR information that has been stored in the UE 1 if the current registration accept message does not contain the NSR information that was indicated by the previous registration accept message. In other words, the UE 1 recognizes that all the network slice restrictions (NSRs) that were configured in the UE 1 in the previous registration accept message have been eliminated.

Alternatively, in step 1302, if the NSR information contained in the current registration accept message does not contain any NSR ID that was included in the NSR information indicated by the previous registration accept message, then the UE 1 recognizes that the NSR specified by this NSR ID not included in the current NSR information have been removed.

Figure 14:
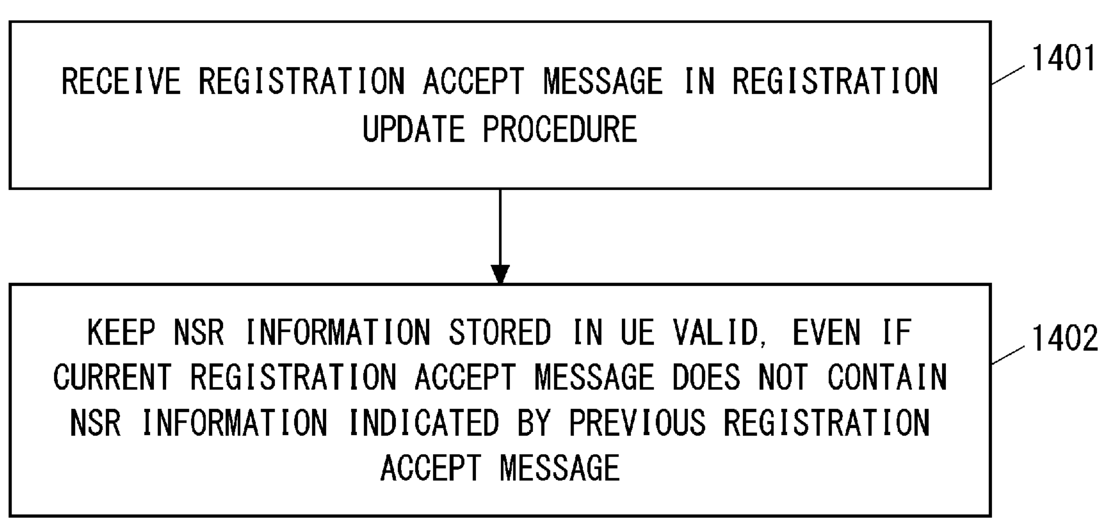
FIG. 14 is a flowchart showing an example of an operation of a UE according to an embodiment.

FIG. 14 shows another example of the operation of the UE 1. In step 1401, the UE 1 receives a registration accept message in a registration update procedure, which corresponds to step 1204 in FIG. 12. In step 1402, the UE 1 keeps the NSR information stored in the UE 1 valid, even if the current registration accept message contains no NSR information. In other words, the UE 1 recognizes that all the network slice restrictions (NSRs) that were configured in the UE 1 in the previous registration accept message have not been removed.

Alternatively, in step 1402, if the NSR information contained in the current registration accept message does not contain any NSR ID contained in the NSR information indicated by the previous registration accept message, then the UE 1 keeps the NSR information stored in the UE 1 regarding that NSR ID valid.

Fourth Embodiment

An example configuration of a communication network according to this embodiment is similar to the example described with reference to FIG. 1. This embodiment provides cell selection and reselection considering network slice restriction (NSR) information.

Figure 15:
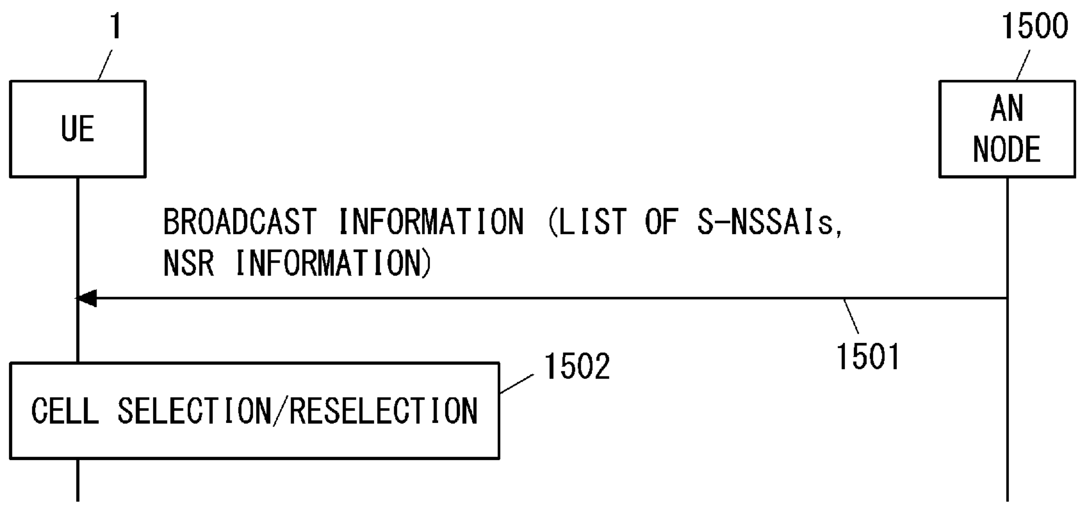
FIG. 15 is a sequence diagram showing an example of operations of a UE and an AN node according to an embodiment.

FIG. 15 shows an example of the operation of the UE 1 and an AN node 1500 according to this embodiment. The AN node 1500 is included in the AN 5. The AN node 1500 may be a gNB in an NG-RAN. In step 1501, the AN node 1500 broadcasts control information in a cell. The UE 1 receives this control information that is broadcast in a cell of the AN 5. The control information may be included in System Information (System Information Block (SIB)).

The control information in step 1501 includes a list of at least one S-NSSAI. The list indicates one or more network slices supported by the AN node 1500 or by the cell of the AN node 1500. The control information further includes Network Slice Restriction (NSR) information. The NSR information indicates whether there is a restriction on the use of the network slice identified by each S-NSSAI in the list of S-NSSAI(s). The NSR information indicates whether there is a restriction on the use of the network slice identified by each S-NSSAI in the list of S-NSSAI(s). In addition, if there is a restriction on the use of the network slice(s), the NSR information indicates a description of that restriction. The contents of the NSR information may be the same as those in the embodiments described above. Specifically, restrictions on the use of a network slice may include at least one of: a restriction on radio frequencies (e.g., frequency bands or sub-bands) with which the network slice is available, a restriction on radio access technologies with which the network slice is available, a restriction on geographic areas in which the network slice is available, a restriction on applications with which the network slice is available, or a restriction based on priorities among multiple network slices.

In one example, the NSR information indicates that a given S-NSSAI is available only in one or more specific frequency bands or is not available in one or more specific frequency bands. In one example, the NSR information indicates that a given S-NSSAI is available only in one or more specific RATs or is not available in one or more specific RATs. In one example, the NSR information indicates that a given S-NSSAI is available only in one or more specific geographic areas or is not available in one or more specific geographic areas. Each geographic area may be a tracking area or a cell. In one example, the NSR information indicates that a given S-NSSAI is available only for one or more specific applications (or services) or is not available for one or more specific applications (or services). In one example, the NSR information indicates that there are priorities among multiple network slices (or S-NSSAIs) allowed for the UE 1. For example, the UE 1 may recognize that when a network slice given a higher priority by the NSR information is in use, a network slice with a lower priority cannot be used. Alternatively, the NSR information may indicate that a given network slice (or S-NSSAI) cannot be used simultaneously with another network slice.

In step 1502, the UE 1 performs cell selection or cell reselection based on the NSR information. For example, if none of the S-NSSAIs in the Allowed NSSAI or Configured NSSAI stored in the UE 1 are included in the list of S-NSSAI(s) broadcast by the AN node 1500 or if all the S-NSSAIs in the Allowed NSSAI or Configured NSSAI stored in the UE 1 are restricted by the NSR information, then the UE 1 may search for another cell in the same PLMN or another cell in another PLMN.

Additionally or alternatively, the UE 1 may select at least one S-NSSAI to include in Requested NSSAI in a registration request message, based on the NSR information. For example, the UE 1 may select, from the S-NSSAI(s) included in the Allowed NSSAI or Configured NSSAI stored in the UE 1, at least one S-NSSAI that is included in the list of S-NSSAI(s) broadcast by the AN node 1500 and is not restricted by the NSR information. The UE 1 may then include the selected at least one S-NSSAI in Requested NSSAI of a registration request message and send this registration request message.

The operation of the UE 1 and AN node 1500 in this embodiment allows the UE 1 to perform cell selection or reselection taking into account network slice usage restrictions.

Fifth Embodiment

An example configuration of a communication network according to this embodiment is similar to the example described with reference to FIG. 1. This embodiment provides admission control based on slice restriction information conducted by the AN 5.

Figure 16:
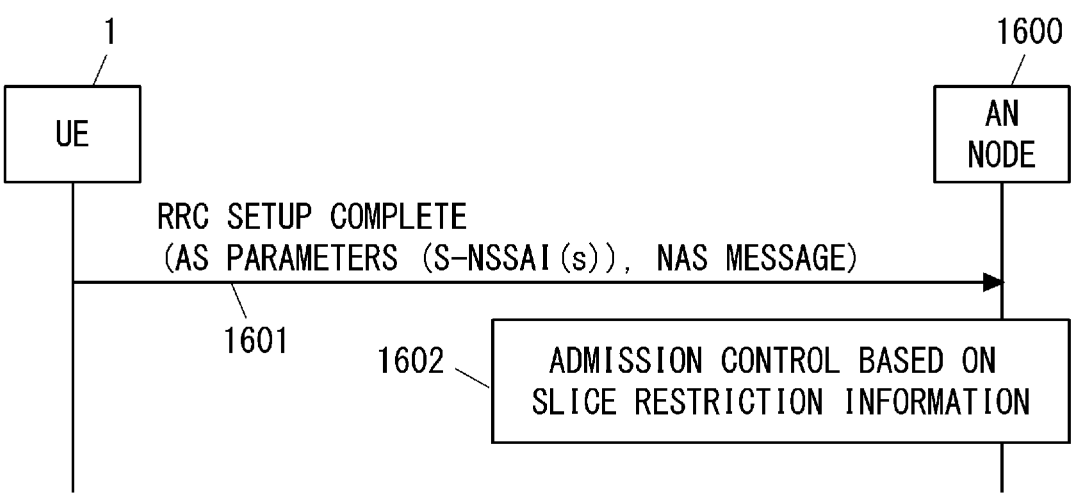
FIG. 16 is a sequence diagram showing an example of operations of a UE and an AN node according to an embodiment.

FIG. 16 shows an example of the operation of the UE 1 and an AN node 1600 according to this embodiment. The AN node 1600 is included in the AN 5. The AN node 1600 may be a gNB in an NG-RAN. In step 1601, the UE 1 sends a Radio Resource Control (RRC) Setup Complete message to the AN node 1600 in an RRC connection establishment procedure. The RRC Setup Complete message contains AS parameters including at least one S-NSSAI and further contains a NAS message. The NAS message may be a Registration Request message or a Service Request message.

The AN node 1600 maintains NSR information. The NSR information indicates whether there are restrictions on the use of a network slice identified by each S-NSSAI in a list of S-NSSAI(s). If there is a restriction on the use of a network slice, the NSR information may indicate, for example, but not limited to, a description of the restriction. The contents of the NSR information may be the same as those in the embodiments described above.

The AN node 1600 may maintain UE-specific NSR information. In this case, the UE-specific NSR information may be sent from the AMF 2 to the AN node 1600 via an INITIAL CONTEXT SETUP REQUEST message, a HANDOVER COMMAND message, a DOWNLINK RAN CONFIGURATION TRANSFER message, or other NG Application Protocol (NGAP) messages.

Figure 17:
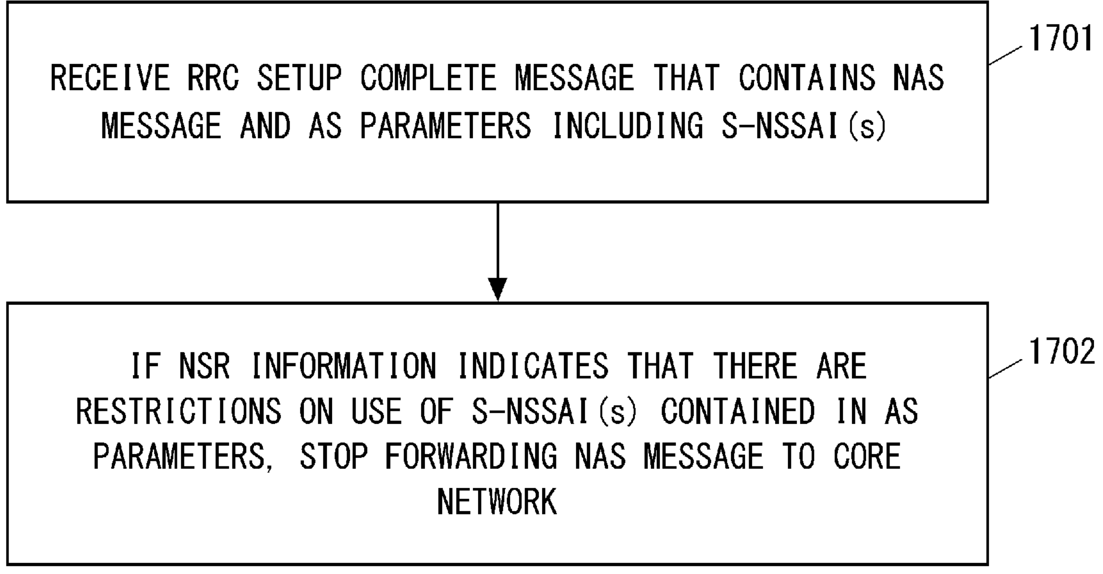
FIG. 17 is a flowchart showing an example of an operation of an AN node according to an embodiment.

In step 1602, the AN node 1600 performs admission control based on the NSR information. The AN node 1600 examines at least one S-NSSAI contained in the AS parameters in the received RRC Setup Complete message based on the NSR information to determine whether to forward the NAS message to the core network (AMF 2). More specifically, the AN node 1600 may operate as shown in FIG. 17.

Step 1701 corresponds to step 1601 in FIG. 16. In step 1701, the AN node 1600 receives a RRC Setup Complete message. The RRC Setup Complete message contains a NAS message and contains AS parameters including at least one S-NSSAI.

In step 1702, the AN node 1600 performs admission control. Specifically, if the NSR information indicates that there are restrictions on the use of all of the at least one S-NSSAI contained in the AS parameters in the received RRC Setup Complete message, then the AN node 1600 stops forwarding the NAS message to the core network (AMF 2). In this case, the AN node 1600 may send to the UE 1 a downlink RRC message indicating that the NAS message cannot be forwarded to the core network due to network slice usage restrictions. The AN node 1600 may send to the UE 1 an RRC Release message containing a release cause set to a value indicating that use of a network slice is restricted.

The AN node 1600 may forward the NAS message to the core network if the AS parameters in the received RRC Setup Complete message include a plurality of S-NSSAIs and if at least one of these S-NSSAIs is allowed based on the NSR information.

This embodiment may be implemented in combination with the fourth embodiment. Specifically, the AN node 1600 may broadcast NSR information. If all of the one or more S-NSSAIs received with a NAS message via an RRC Setup Complete message violate the NSR information, the AN node 1600 may stop forwarding this NAS message to the core network.

This embodiment allows an AN node to control the forwarding of NAS messages taking into account usage restrictions of network slices.

Sixth Embodiment

An example configuration of a communication network according to this embodiment is similar to the example described with reference to FIG. 1. This embodiment provides admission control for handover operations based on slice restriction information performed by the AN 5.

Figure 18:
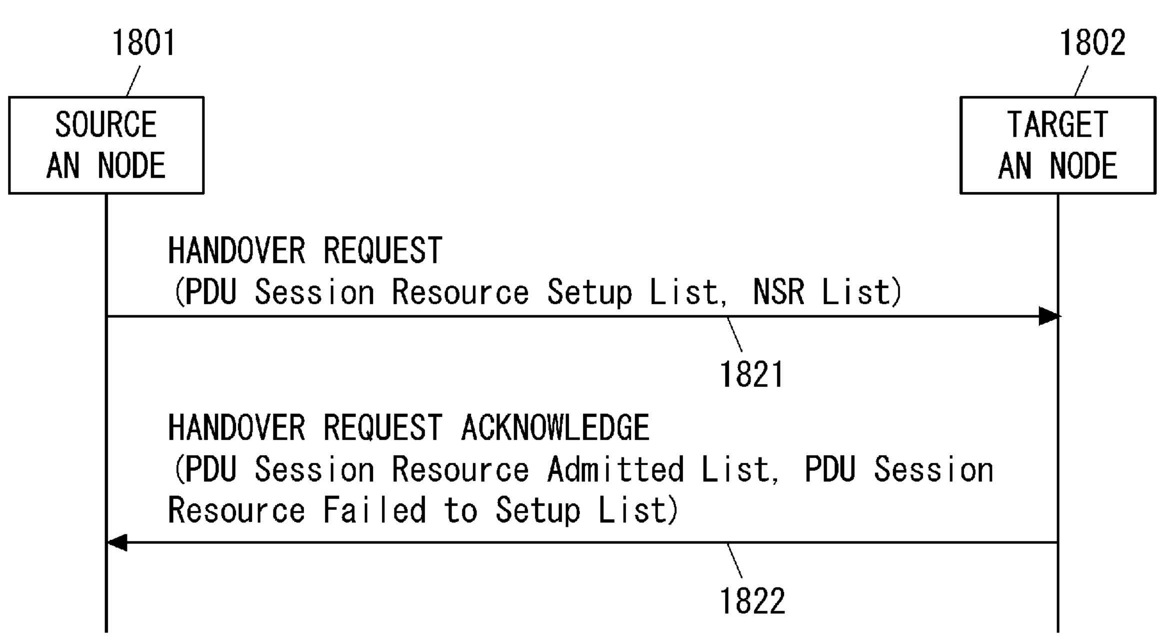
FIG. 18 is a sequence diagram showing an example of operations of a source AN node and a target AN node according to an embodiment.

FIG. 18 shows an example of the operation regarding handover of the UE 1 according to this embodiment. A source AN node 1801 and a target AN node 1802 are included in the AN 5. The source AN node 1801 and the target AN node 1802 may be gNBs in an NG-RAN. In step 1821, the source AN node 1801 sends a HANDOVER REQUEST message to the target AN node 1802 in a handover procedure. The HANDOVER REQUEST message contains information about at least one PDU Session. The information about the PDU Session may include an S-NSSAI to which the PDU Session belongs, and NSR information. The NSR information may be UE-specific NSR information. The information about the PDU Session may be a PDU Session Resource Setup List information element (IE).

Target AN node 1802 maintains NSR information. The NSR information indicates whether there are restrictions on the use of a network slice identified by an S-NSSAI. If there are restrictions on the use of the network slice, the NSR information may indicate, for example, but not limited to, a description of the restrictions. The contents of the NSR information may be the same as those in the embodiments described above.

In step 1822, the target AN node 1802 performs admission control for each PDU Session based on the NSR information maintained by the target AN node 1802 and the NSR information received from the source AN node 1801 in step 1821. The target AN Node 1802 examines each PDU Session requested in the HANDOVER REQUEST message based on these NSR information and decides whether or not to accept (or admit) that PDU Session. The target AN node 1802 includes one or more accepted PDU Sessions in a PDU Session Resource Admitted list IE in a HANDOVER REQUEST ACKNOWLEDGE message, and one or more rejected PDU Sessions in a PDU Session Resource Failed to Setup List IE in that HANDOVER REQUEST ACKNOWLEDGE message. The target AN node 1802 sends the HANDOVER REQUEST ACKNOWLEDGE message to the source AN node 1801.

Figure 19:
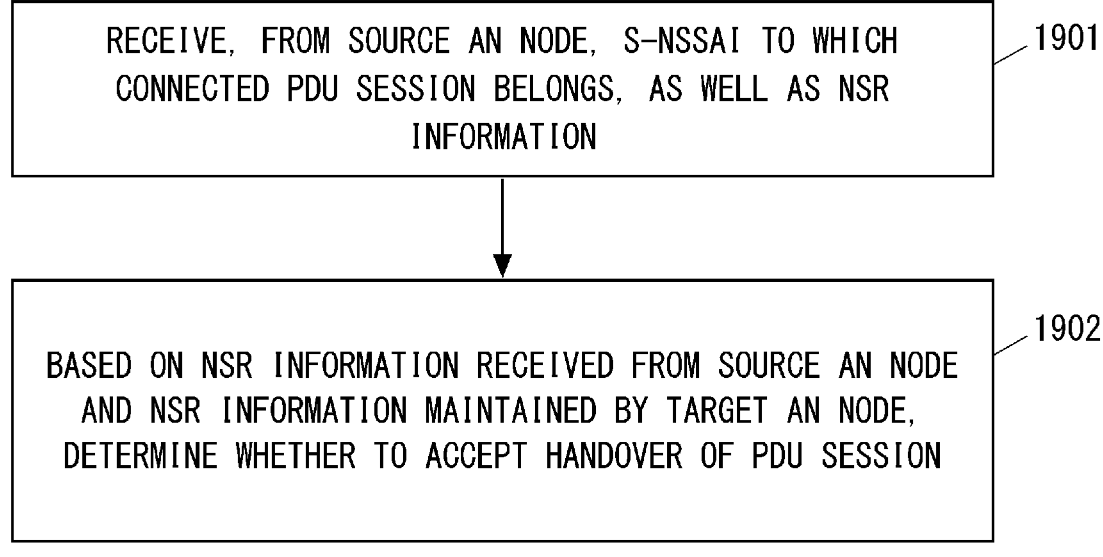
FIG. 19 is a flowchart showing an example of an operation of a target AN node according to an embodiment.

More specifically, the target AN node 1802 may operate as shown in FIG. 19. Step 1901 corresponds to step 1821 in FIG. 18. In step 1901, the target AN node 1802 receives a HANDOVER REQUEST message. The HANDOVER REQUEST message indicates an S-NSSAI to which the PDU Session to which the UE 1 to be handed over is connected belongs, as well as NSR information.

In step 1902, the target AN node 1802 performs admission control for each PDU Session. Specifically, based on the NSR information maintained by the target AN node 1802 and the NSR information received from the source AN node 1801 in step 1901, the target AN node 1802 determines if there is a restriction on the use of each PDU Session requested by the HANDOVER REQUEST message (or a network slice with which the PDU Session is associated). If the use of a PDU Session (or associated slice) is restricted, then the target AN Node 1802 refuses to accept (or admit) that PDU Session. In this case, the target AN node 1802 includes this PDU Session in the PDU Session Resource Failed to Setup List IE. On the other hand, if the use of a PDU Session (or associated slice) is not restricted, then the target AN Node 1802 decides to accept (or admit) that PDU Session. In this case, the target AN node 1802 includes this PDU Session in the PDU Session Resource Admitted List IE. The target AN node 1802 sends a HANDOVER REQUEST ACKNOWLEDGE message containing one or both of the PDU Session Resource Failed to Setup List and the PDU Session Resource Admitted list to the source AN node 1801.

Seventh Embodiment

An example configuration of a communication network according to this embodiment is similar to the example described with reference to FIG. 1. This embodiment provides admission control based on slice restriction information contained in a UE Route Selection Policy (URSP).

Figure 20:
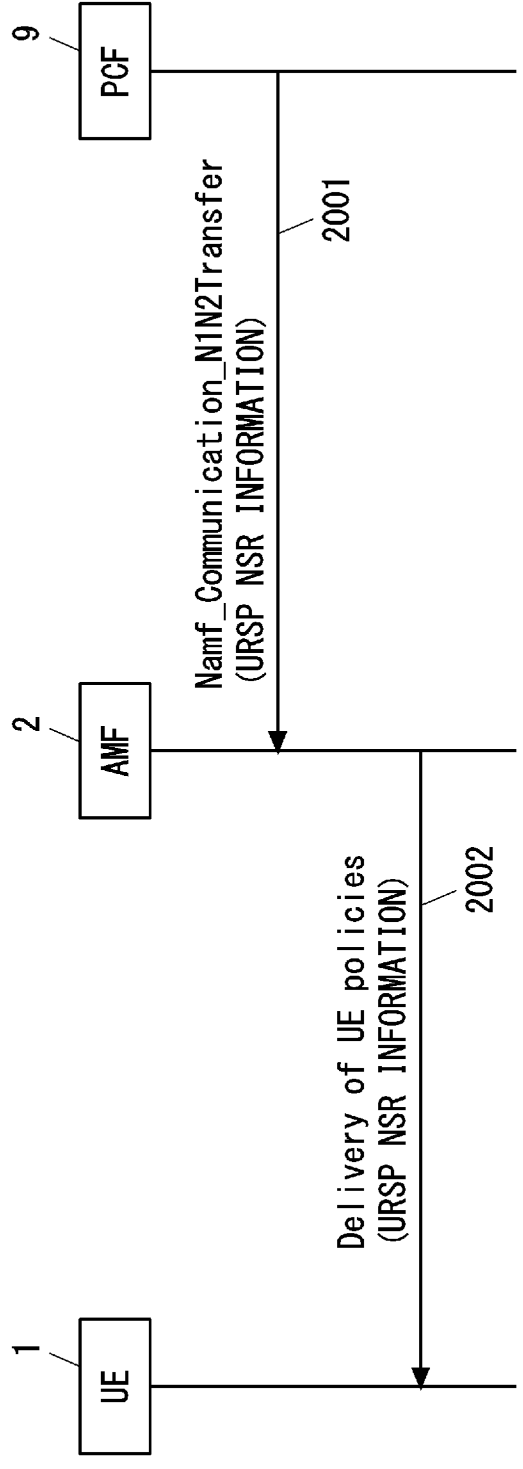
FIG. 20 is a sequence diagram showing an example of operations of a UE, an AMF, and a PCF according to an embodiment.

FIG. 20 shows an example of the signaling between the UE 1 and PCF 9 performed in a UE policy update procedure (see Section 4.2.4.3 of Non-Patent Literature 2). In step 2001, the PCF 9 sends a Namf_Communication_N1N2Transfer containing URSP network slice restriction (NSR) information to the AMF 2.

In step 2002, the AMF 2 transfers transparently the URSP NSR information received from the PCF 9 to the UE 1. The AMF 2 may send to the UE 1 a Configuration Update Command message containing the URSP NSR information received from the PCF 9.

The URSP NSR information indicates whether there are restrictions on the use of a network slice identified by each S-NSSAI. In addition, if there are restrictions on the use of a network slice, the URSP NSR information indicates a description of those restrictions. Restrictions on the use of a network slice may include at least one of: a restriction on radio frequencies (e.g., frequency bands or sub-bands) with which the network slice is available, a restriction on radio access technologies with which the network slice is available, a restriction on geographic areas or a registration area in which the network slice is available, a restriction on applications with which the network slice is available, or a restriction based on priorities among multiple network slices.

In one example, the URSP NSR information indicates that a given S-NSSAI is available only in one or more specific frequency bands or is not available in one or more specific frequency bands. In one example, the NSR information indicates that a given S-NSSAI is available only in one or more specific RATs or is not available in one or more specific RATs. In one example, the NSR information indicates that a given S-NSSAI is available only in one or more specific geographic areas or is not available in one or more specific geographic areas. Each geographic area may be a tracking area or a cell. In one example, the NSR information indicates that a given S-NSSAI is available only for one or more specific applications (or services) or is not available for one or more specific applications (or services). In one example, the NSR information indicates that there are priorities among multiple network slices (or S-NSSAIs) allowed for the UE 1. For example, when the UE 1 is using a network slice given a higher priority by the NSR information, the UE 1 may recognize that network slices of lower priority cannot be used at the same time. Alternatively, the NSR information may indicate that a given network slice (or S-NSSAI) cannot be used simultaneously with another network slice.

Figure 21:
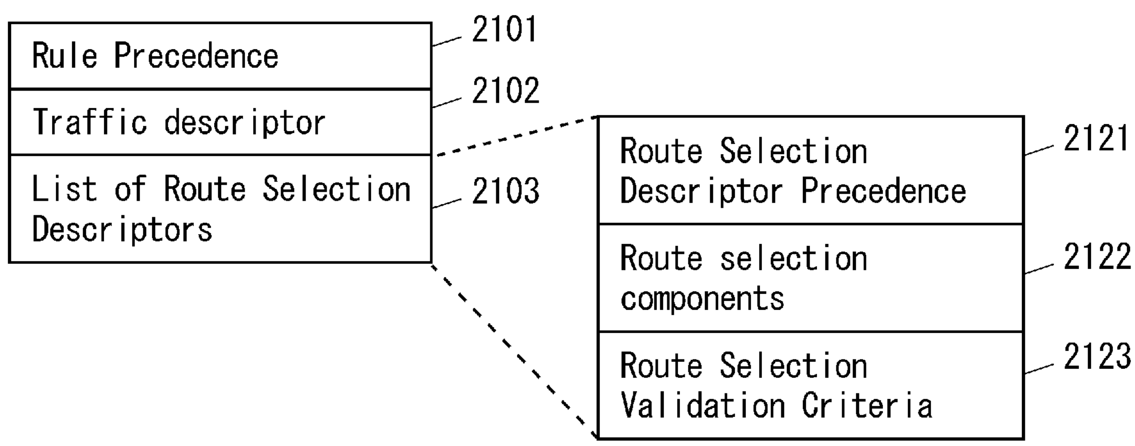
FIG. 21 shows an example format of URSP Network Slice Restriction (URSP NSR) information according to an embodiment.

FIG. 21 shows an example format of the URSP NSR information. In the example in FIG. 21, the format 2100 of the URSP NSR information includes a Rule Precedence field 2101, one or more Traffic descriptor fields 2102, and one or more Route Selection Descriptors fields 2103. The Rule Precedence field 2101 indicates the priority of a Rule. Each Traffic Descriptor field 2102 indicates a characteristic of the traffic associated with the Rule. Each Route Selection Descriptors field 2103 indicates a routing rule for the traffic associated with each Traffic descriptor field 2102.

One Route Selection Descriptors field 2103 contains a Route Selection Descriptor Precedence field 2121, a Route selection components field 2122, and a Route Selection Validation Criteria field 2123. The Route Selection Descriptor Precedence field 2121 indicates the priority of a traffic routing rule. The Route selection components field 2122 indicates various information used in a traffic routing configuration. The Route Selection Validation Criteria field 2123 indicates various criteria for traffic routing. In addition, the Route selection components field 2122 contains an S-NSSAI value. That is, the S-NSSAI indicated by the Route selection components field 2122 is associated with the traffic identified by the Traffic descriptor field 2102.

In some implementations, a condition contained in the Route Selection Validation Criteria field 2123 may indicate a geographic area in which the network slice identified by the Route selection components field 2122 is allowed (or prohibited) to be used. In this case, the condition may indicate geographical location data, a list of TAs, or a list of cells. These may be a subset of the TAs or cells in the current registration area of the UE 1.

In the second example, a condition contained in the Route Selection Validation Criteria field 2123 may indicate a restriction related to radio frequencies. In this case, the condition may indicate a frequency band in which the network slice identified by the Route selection components field 2122 is allowed (or forbidden) to be used.

In the third example, a condition contained in the Route Selection Validation Criteria field 2123 may indicate a restriction related to RATs. In this case, the condition may indicate a RAT on which the network slice identified by the Route selection components field 2122 is allowed (or forbidden) to be used.

In the fourth example, a condition contained in the Route Selection Validation Criteria field 2123 may indicate a restriction regarding priorities among multiple network slices. In this case, the condition may indicate the priority of the network slice identified by the Route selection components field 2122, or may indicate that it is not allowed to be used concurrently with another (specific) network slice.

Figure 22:
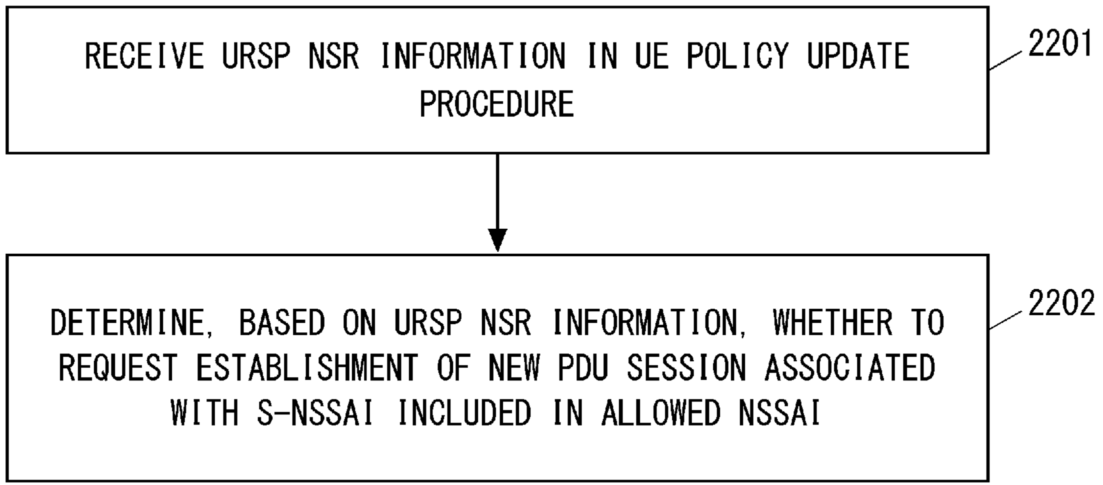
FIG. 22 is a flowchart showing an example of an operation of a UE according to an embodiment.

The following provides a specific example of the behavior of the UE 1 after receiving the URSP NSR information from the PCF 9. FIG. 22 shows an example of the operation of the UE 1. In step 2201, the UE 1 receives the URSP NSR information in a UE policy update procedure. In step 2202, the UE 1 determines, based on the URSP NSR information, whether to request the core network to establish a new PDU Session associated with the S-NSSAI included in the Allowed NSSAI. In other words, the UE 1 uses the URSP NSR information to determine whether or not to send a PDU Session Establishment Request message. In one example, as already described, the URSP NSR information may indicate that the use of a particular S-NSSAI is allowed (or prohibited) within a specific geographic area. In this case, if the current location of the UE 1 is within that specific geographic area, the UE 1 requests (or stops requesting) the core network to establish a new PDU Session associated with that particular S-NSSAI. The UE 1 may perform a similar action if the URSP NSR information indicates other restrictions (e.g., frequency band, RAT, application, or priority restrictions).

As understood from the above description, in this embodiment, the PCF 9 configures the UE 1 with the URSP NSR information. The UE 1 then determines the availability of each S-NSSAI included in the Allowed NSSAI based on the URSP NSR information. This allows for more detailed control over the use of network slices by the UE 1 within the registration area of the UE 1.

Figure 23:
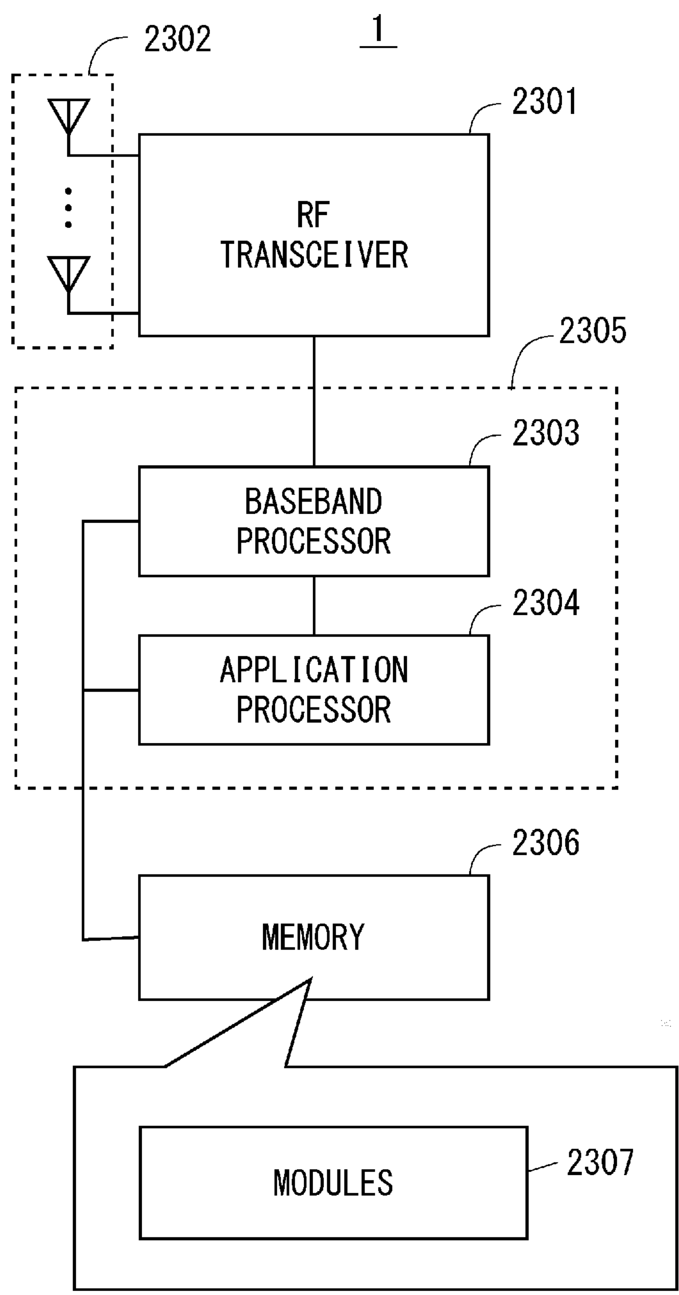
FIG. 23 is a block diagram showing an example configuration of a UE according to an embodiment.

The following provides configuration examples of the UE 1, the AMF 2, and the AN nodes 1500, 1600, 1801, and 1802 according to the above-described embodiments. FIG. 23 is a block diagram showing an example configuration of the UE 1. A Radio Frequency (RF) transceiver 2301 performs analog RF signal processing to communicate with RAN nodes. The RF transceiver 2301 may include a plurality of transceivers. The analog RF signal processing performed by the RF transceiver 2301 includes frequency up-conversion, frequency down-conversion, and amplification. The RF transceiver 2301 is coupled to an antenna array 2302 and a baseband processor 2303. The RF transceiver 2301 receives modulated symbol data (or OFDM symbol data) from the baseband processor 2303, generates a transmission RF signal, and supplies the transmission RF signal to the antenna array 2302. Further, the RF transceiver 2301 generates a baseband reception signal based on a reception RF signal received by the antenna array 2302 and supplies the baseband reception signal to the baseband processor 2303. The RF transceiver 2301 may include an analog beamformer circuit for beam forming. The analog beamformer circuit includes, for example, a plurality of phase shifters and a plurality of power amplifiers.

The baseband processor 2303 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame) (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 2303 may include, for example, signal processing of Service Data Adaptation Protocol (SDAP), Packet Data Convergence Protocol (PDCP), Radio Link Control (RLC), Medium Access Control (MAC), and Physical (PHY) layers. Further, the control-plane processing performed by the baseband processor 2303 may include processing of Non-Access Stratum (NAS) protocols, Radio Resource Control (RRC) protocols, and MAC Control Elements (CEs).

The baseband processor 2303 may perform Multiple Input Multiple Output (MIMO) encoding and pre-coding for beam forming.

The baseband processor 2303 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 2304 described in the following.

The application processor 2304 is also referred to as a CPU, an MPU, a microprocessor, or a processor core. The application processor 2304 may include a plurality of processors (or processor cores). The application processor 2304 loads a system software program (Operating System (OS)) and various application programs (e.g., a call application, a WEB browser, a mailer, a camera operation application, and a music player application) from a memory 2306 or from another memory (not shown) and executes these programs, thereby providing various functions of the UE 1.

In some implementations, as represented by a dashed line (2305) in FIG. 23, the baseband processor 2303 and the application processor 2304 may be integrated on a single chip. In other words, the baseband processor 2303 and the application processor 2304 may be implemented in a single System on Chip (SoC) device 2305. The SoC device may be referred to as a Large-Scale Integration (LSI) or a chipset.

The memory 2306 is a volatile memory, a non-volatile memory, or a combination thereof. The memory 2306 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2306 may include, for example, an external memory device that can be accessed from the baseband processor 2303, the application processor 2304, and the SoC 2305. The memory 2306 may include an internal memory device that is integrated in the baseband processor 2303, the application processor 2304, or the SoC 2305. Further, the memory 2306 may include a memory in a Universal Integrated Circuit Card (UICC).

The memory 2306 may store one or more software modules (computer programs) 2307 including instructions and data to perform the processing by the UE 1 described in the above embodiments. In some implementations, the baseband processor 2303 or the application processor 2304 may load these software modules 2307 from the memory 2306 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 2301 and the antenna array 2302, i.e., achieved by the memory 2306, which stores the software modules 2307, and one or both of the baseband processor 2303 and the application processor 2304.

Figure 24:
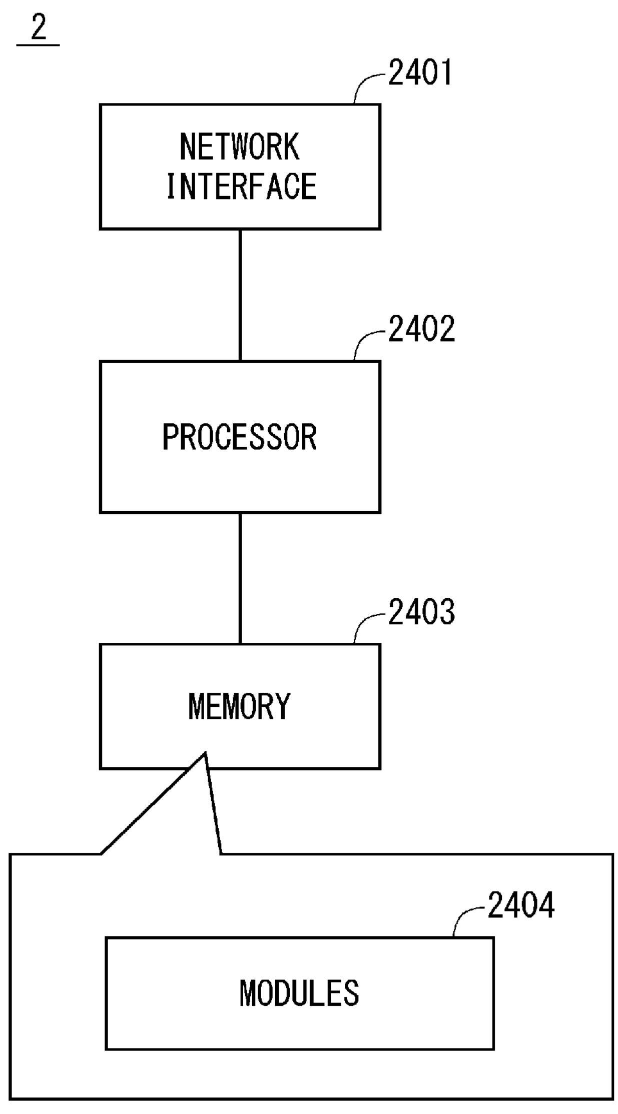
FIG. 24 is a block diagram showing an example configuration of an AMF according to an embodiment.

FIG. 24 shows an example configuration of the AMF 2. Referring to FIG. 24, the AMF 2 includes a network interface 2401, a processor 2402, and a memory 2403. The network interface 2401 is used to communicate with, for example, (R)AN nodes and with other network functions (NFs) or nodes in the SGC. The other NFs or nodes in the 5GC include, for example, UDM, AUSF, SMF, and PCF. The network interface 2401 may include, for example, a network interface card (NIC) conforming to the IEEE 802.3 series.

The processor 2402 may be, for example, a microprocessor, a Micro Processing Unit (MPU), or a Central Processing Unit (CPU). The processor 2402 may include a plurality of processors.

The memory 2403 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2403 may include a storage located apart from the processor 2402. In this case, the processor 2402 may access the memory 2403 via the network interface 2401 or an I/O interface.

The memory 2403 may store one or more software modules (computer programs) 2404 including instructions and data to perform the processing of the AMF 2 described in the above embodiments. In some implementations, the processor 2402 may be configured to load the one or more software modules 2404 from the memory 2403 and execute the loaded software modules, thereby performing the processing of the AMF 2 described in the above embodiments.

Figure 25:
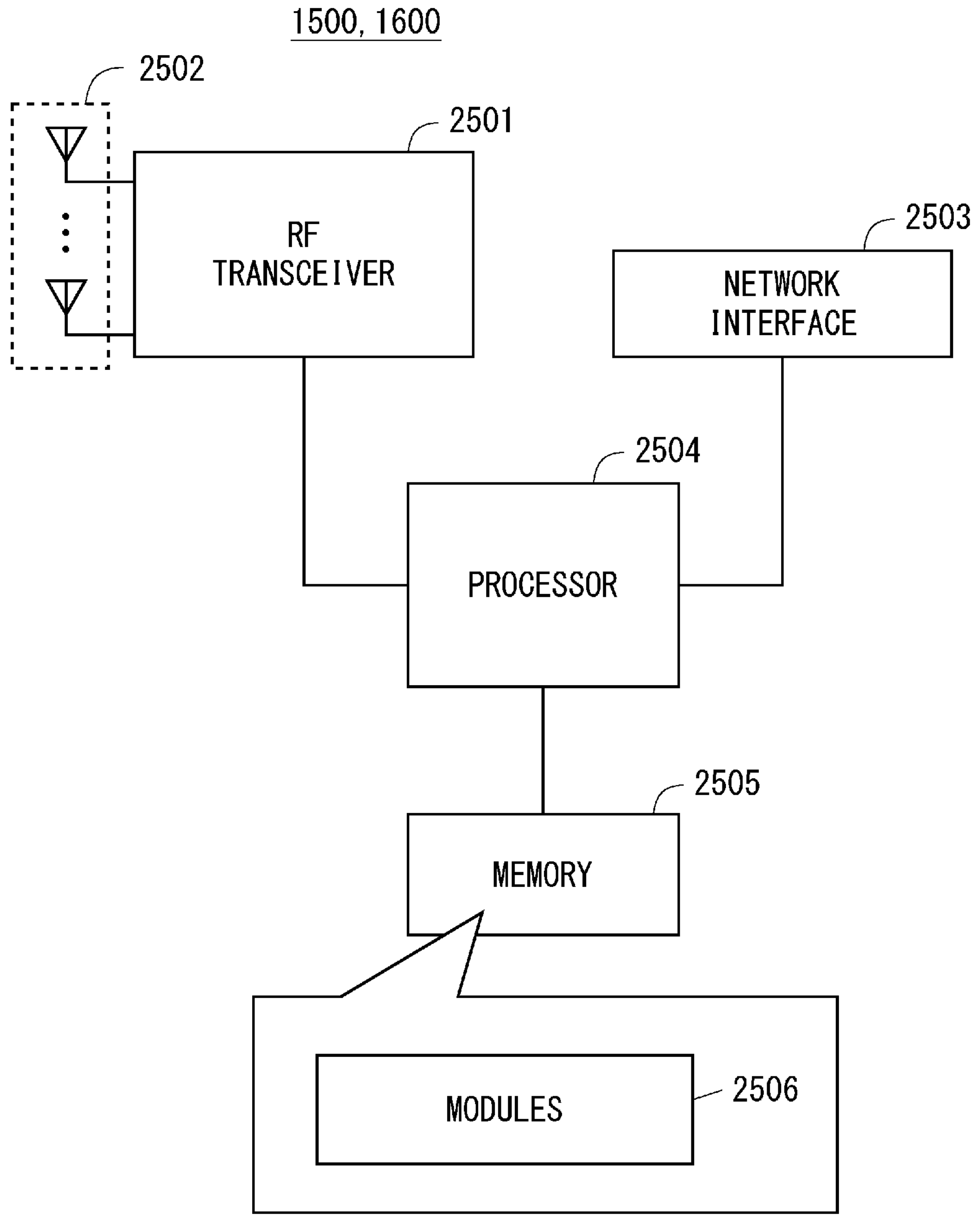
FIG. 25 is a block diagram showing an example configuration of an AN node according to an embodiment.

FIG. 25 is a block diagram showing an example configuration of the AN node 1500. The AN nodes 1600, 1801, and 1802 may have the configuration shown in FIG. 25 as well. Referring to FIG. 25, the AN node 1500 includes an RF transceiver 2501, a network interface 2503, a processor 2504, and a memory 2505. The RF transceiver 2501 performs analog RF signal processing to communicate with UEs. The RF transceiver 2501 may include a plurality of transceivers. The RF transceiver 2501 is coupled to an antenna array 2502 and the processor 2504. The RF transceiver 2501 receives modulated symbol data from the processor 2504, generates a transmission RF signal, and supplies the transmission RF signal to the antenna array 2502. Further, the RF transceiver 2501 generates a baseband reception signal based on a reception RF signal received by the antenna array 2502 and supplies the baseband reception signal to the processor 2504. The RF transceiver 2501 may include an analog beamformer circuit for beam forming. The analog beamformer circuit includes, for example, a plurality of phase shifters and a plurality of power amplifiers.

The network interface 2503 is used to communicate with network nodes (e.g., other AN nodes and core network nodes). The network interface 2503 may include, for example, a network interface card (NIC) conforming to the IEEE 802.3 series.

The processor 2504 performs digital baseband signal processing (i.e., data-plane processing) and control-plane processing for radio communication. The processor 2504 may include a plurality of processors. The processor 2504 may include, for example, a modem processor (e.g., DSP) that performs digital baseband signal processing and a protocol stack processor (e.g., CPU or MPU) that performs the control-plane processing.

The digital baseband signal processing performed by the processor 2504 may include, for example, signal processing of SDAP, PDCP, RLC, MAC, and PHY layers. The control-plane processing performed by the processor 2504 may include processing of NAS protocols, RRC protocols, MAC CEs, and DCIs.

The processor 2504 may include a digital beamformer module for beam forming. The digital beamformer module may include a Multiple Input Multiple Output (MIMO) encoder and a pre-coder.

The memory 2505 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2505 may include a storage located apart from the processor 2504. In this case, the processor 2504 may access the memory 2505 via the network interface 2503 or an I/O interface.

The memory 2505 may store one or more software modules (computer programs) 2506 including instructions and data to perform processing by the AN node 1500 described in the above embodiments. In some implementations, the processor 2504 may be configured to load the software modules 2506 from the memory 2505 and execute the loaded software modules, thereby performing processing of the AN node 1500 described in the above embodiments.

When the AN node 1500 is a Central Unit (e.g., gNB-CU) in a cloud RAN (C-RAN) deployment, the AN node 1500 does not need to include the RF transceiver 2501 (and the antenna array 2502).

As described using FIG. 23, FIG. 24, and FIG. 25, each of the processors in the UE 1, AMF 2, and AN nodes 1500, 1600, 1801, and 1802 according to the embodiments described above executes one or more programs, containing a set of instructions, to cause a computer to perform an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note A1)

A User Equipment (UE) comprising:

at least one memory; and at least one processor coupled to the at least one memory and configured to receive control information broadcast in a cell of an access network, wherein the control information includes a list of at least one network slice identifier and further includes slice restriction information, the slice restriction information indicating whether there is a restriction on use of a network slice identified by each of the at least one network slice identifier and a description of the restriction.

(Supplementary Note A2)

The UE according to Supplementary Note A1, wherein the restriction includes at least one of: a restriction on radio frequencies with which the network slice is available, a restriction on radio access technologies with which the network slice is available, a restriction on geographic areas in which the network slice is available, a restriction on applications with which the network slice is available, or a restriction based on priorities among multiple network slices.

(Supplementary Note A3)

The UE according to Supplementary Note A1 or A2, wherein the at least one processor is configured to perform cell selection or cell reselection based on the slice restriction information.

(Supplementary Note A4)

The UE according to any one of Supplementary Notes A1 to A3, wherein the at least one processor is configured to:

select at least one network slice identifier for inclusion in a list of requested network slice identifiers based on the slice restriction information; and send a registration request message containing the list of requested network slice identifiers to a core network via the access network.

(Supplementary Note A5)

An access network (AN) node comprising:

at least one memory; and at least one processor coupled to the at least one memory and configured to broadcast control information in a cell, wherein the control information includes a list of at least one network slice identifier and further includes slice restriction information, the slice restriction information indicating whether there is a restriction on use of a network slice identified by each of the at least one network slice identifier and a description of the restriction.

(Supplementary Note A6)

The AN node according to Supplementary Note A5, wherein the restriction includes at least one of: a restriction on radio frequencies with which the network slice is available, a restriction on radio access technologies with which the network slice is available, a restriction on geographic areas in which the network slice is available, a restriction on applications with which the network slice is available, or a restriction based on priorities among multiple network slices.

(Supplementary Note A7)

The AN node according to Supplementary Note A5 or A6, wherein the control information causes a User Equipment (UE) that receives the control information to perform cell selection or cell reselection based on the slice restriction information.

(Supplementary Note A8)

The AN node according to any one of Supplementary Notes A5 to A7, wherein the control information causes a User Equipment (UE) receiving the control information to select at least one network slice identifier for inclusion in a list of requested network slice identifiers and to send a registration request message containing the list of requested network slice identifiers to a core network.

(Supplementary Note A9)

A method performed by a User Equipment (UE), the method comprising:

receiving control information broadcast in a cell of an access network, wherein the control information includes a list of at least one network slice identifier and further includes slice restriction information, the slice restriction information indicating whether there is a restriction on use of a network slice identified by each of the at least one network slice identifier and a description of the restriction.

(Supplementary Note A10)

A method performed by an access network (AN) node, the method comprising:

broadcasting control information in a cell, wherein the control information includes a list of at least one network slice identifier and further includes slice restriction information, the slice restriction information indicating whether there is a restriction on use of a network slice identified by each of the at least one network slice identifier and a description of the restriction.

(Supplementary Note B1)

An access network (AN) node comprising:

at least one memory; and at least one processor coupled to the at least one memory and configured to:

maintain slice restriction information;

receive, in a Radio Resource Control (RRC) connection establishment procedure, an RRC Setup Complete message from a User Equipment (UE), the RRC Setup Complete message containing an Access Stratum (AS) parameter, including at least one network slice identifier, and a Non-Access Stratum (NAS) message; and stop forwarding the NAS message to a core network if the slice restriction information indicates that there is a restriction on use of the at least one network slice identifier contained in the AS parameter.

(Supplementary Note B2)

The AN node according to Supplementary Note B1, wherein the at least one processor is configured to send an RRC Release message to the UE containing a release cause set to a value indicating that use of a network slice is restricted.

(Supplementary Note B3)

The AN node according to Supplementary Note B1, wherein the at least one processor is configured to send a downlink RRC message to the UE indicating that the NAS message is not forwarded to the core network due to a network slice usage restriction.

(Supplementary Note B4)

The AN node according to any one of Supplementary Notes B1 to B3, wherein the NAS message is a Registration Request message or a Service Request message.

(Supplementary Note B5)

A method performed by an access network (AN) node, the method comprising:

maintaining slice restriction information;

receiving, in a Radio Resource Control (RRC) connection establishment procedure, an RRC Setup Complete message from a User Equipment (UE), the RRC Setup Complete message containing an Access Stratum (AS) parameter, including at least one network slice identifier, and a Non-Access Stratum (NAS) message; and stopping forwarding the NAS message to a core network if the slice restriction information indicates that there is a restriction on use of the at least one network slice identifier contained in the AS parameter.

(Supplementary Note C1)

A User Equipment (UE) comprising:

at least one memory; and at least one processor coupled to the at least one memory and configured to:

send, via an access network, a first registration request message requesting registration to a core network to a core network node for mobility management in the core network; and receive a first registration accept message from the core network node via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note C2)

The UE according to Supplementary Note C1, wherein the restriction includes at least one of: a restriction on radio frequencies with which the network slice is available, a restriction on radio access technologies with which the network slice is available, a restriction on geographic areas in which the network slice is available, a restriction on applications with which the network slice is available, or a restriction based on priorities among multiple network slices.

(Supplementary Note C3)

The UE according to Supplementary Note C1 or C2, wherein the at least one processor is configured to include a request for the first slice restriction information in the first registration request message.

(Supplementary Note C4)

The UE according to Supplementary Note C3, wherein the at least one processor is configured to include the request for the first slice restriction information in the first registration request message in response to receiving broadcast information from the access network indicating that a network slice usage restriction has been imposed.

(Supplementary Note C5)

The UE according to any one of Supplementary Notes C1 to C4, wherein the first slice restriction information indicates an association between an identifier of the restriction and a network slice identifier on which the restriction is imposed.

(Supplementary Note C6)

The UE according to any one of Supplementary Notes C1 to C5, wherein the at least one processor is configured to determine, based on the first slice restriction information, whether to send a request for establishment of a new PDU Session associated with one of the at least one allowed network slice identifier.

(Supplementary Note C7)

The UE according to any one of Supplementary Notes C1 to C6, wherein the at least one processor is configured to determine, based on the first slice restriction information, whether to request the core network to activate a user plane connection for an established PDU Session associated with one of the at least one allowed network slice identifier.

(Supplementary Note C8)

The UE according to any one of Supplementary Notes C1 to C7, wherein the at least one processor is configured to:

further receive from the core network node one or both of a first list of slice restrictions imposed on the UE and a second list of slice restrictions not imposed on the UE; and determine, based on one or both of the first list and the second list, whether the first slice restriction information needs to be followed.

(Supplementary Note C9)

The UE according to any one of Supplementary Notes C1 to C8, wherein the at least one processor is configured to:

after receiving the first registration accept message, send a second registration request message to the core network node in accordance with a mobility registration update or periodic registration update procedure, and receive a second registration accept message from the core network node; and discard the first slice restriction information if the second registration accept message does not contain second slice restriction information regarding the at least one allowed network slice identifier indicated by the first registration request message.

(Supplementary Note C10)

The UE according to any one of Supplementary Notes C1 to C8, wherein the at least one processor is configured to:

after receiving the first registration accept message, send a second registration request message to the core network node in accordance with a mobility registration update or periodic registration update procedure, and receive a second registration accept message from the core network node; and keep the first slice restriction information valid, even if the second registration accept message does not contain second slice restriction information regarding the at least one allowed network slice identifier indicated by the first registration request message.

(Supplementary Note C11)

A core network node for mobility management, comprising:

at least one memory; and at least one processor coupled to the at least one memory and configured to:

receive, via an access network, a first registration request message requesting registration to a core network from a User Equipment (UE); and send a first registration accept message to the UE via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note C12)

The core network node according to Supplementary Note C11, wherein the restriction includes at least one of: a restriction on radio frequencies with which the network slice is available, a restriction on radio access technologies with which the network slice is available, a restriction on geographic areas in which the network slice is available, a restriction on applications with which the network slice is available, or a restriction based on priorities among multiple network slices.

(Supplementary Note C13)

The core network node according to Supplementary Note C11 or C12, wherein the at least one processor is configured to the first slice restriction information in the first registration accept message in response to determining that the first registration request message includes a request for the first slice restriction information.

(Supplementary Note C14)

The core network node according to any one of Supplementary Notes C11 to C13, wherein the first slice restriction information indicates an association between an identifier of the restriction and a network slice identifier on which the restriction is imposed.

(Supplementary Note C15)

The core network node according to any one of Supplementary Notes C11 to C14, wherein the first slice restriction information is used by the UE to determine whether to send a request for establishment of a new PDU Session associated with one of the at least one allowed network slice identifier.

(Supplementary Note C16)

The core network node according to any one of Supplementary Notes C11 to C15, wherein the first slice restriction information is used by the UE to determine whether to request the core network to activate a user plane connection for an established PDU Session associated with one of the at least one allowed network slice identifier.

(Supplementary Note C17)

The core network node according to any one of Supplementary Notes C11 to C16, wherein the at least one processor is configured to receive the first slice restriction information from another network function.

(Supplementary Note C18)

The core network node according to any one of Supplementary Notes C11 to C17, wherein the at least one processor is configured to send to the UE one or both of a first list of slice restrictions imposed on the UE and a second list of slice restrictions not imposed on the UE, wherein one or both of the first list and the second list are used by the UE to determine whether the UE needs to follow the first slice restriction information.

(Supplementary Note C19)

The core network node according to Supplementary Note C18, wherein the at least one processor is configured to receive one or both of the first list and the second list from another network function.

(Supplementary Note C20)

A method performed by a User Equipment (UE), the method comprising:

sending, via an access network, a first registration request message requesting registration to a core network to a core network node for mobility management in the core network; and receiving a first registration accept message from the core network node via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note C21)

A method performed by a core network node for mobility management, the method comprising:

receiving, via an access network, a first registration request message requesting registration to a core network from a User Equipment (UE); and sending a first registration accept message to the UE via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note C22)

A program for causing a computer to perform a method for a User Equipment (UE), the method comprising:

sending, via an access network, a first registration request message requesting registration to a core network to a core network node for mobility management in the core network; and receiving a first registration accept message from the core network node via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note C23)

A program for causing a computer to perform a method for a core network node for mobility management, the method comprising:

receiving, via an access network, a first registration request message requesting registration to a core network from a User Equipment (UE); and sending a first registration accept message to the UE via the access network, wherein the first registration accept message contains a list of at least one allowed network slice identifier that is available for use by the UE in a current registration area, and the first registration accept message further contains first slice restriction information, the first slice restriction information indicating whether there is a restriction on the use of a network slice identified by each allowed network slice identifier and a description of the restriction.

(Supplementary Note D1)

A method performed by an Access and Mobility Management Function (AMF) apparatus, the method comprising:

receiving, from a terminal, a registration request message including first information indicating support for a restriction feature related to simultaneous use of network slices;

receiving, from a Unified Data Management (UDM) apparatus, terminal subscription information including second information that indicates a restriction related to simultaneous use of network slices; and sending, to the terminal, a registration accept message including a Single Network Slice Selection Assistance Information (S-NSSAI) and third information in a case where the first information and the second information are received, wherein the third information is included in the terminal subscription information and indicates for the S-NSSAI a restriction related to simultaneous use of network slices.

(Supplementary Note D2)

The method according to Supplementary Note D1, wherein the third information is included in the second information.

(Supplementary Note D3)

A method performed by a terminal, the method comprising:

sending, to an Access and Mobility Management Function (AMF) apparatus, a registration request message including first information indicating support for a restriction feature related to simultaneous use of network slices; and receiving, from the AMF apparatus, a registration accept message including a Single Network Slice Selection Assistance Information (S-NSSAI) and third information, in a case where the first information and second information are received by the AMF apparatus, wherein the second information is included in terminal subscription information and indicates a restriction related to simultaneous use of network slices, and the third information is included in the terminal subscription information and indicates for the S-NSSAI a restriction related to simultaneous use of network slices.

(Supplementary Note D4)

The method according to Supplementary Note D3, wherein the third information is included in the second information.

(Supplementary Note D5)

An Access and Mobility Management Function (AMF) apparatus comprising:

at least one memory; and at least one processor coupled to the at least one memory and configured to:

receive, from a terminal, a registration request message including first information indicating support for a restriction feature related to simultaneous use of network slices;

receive, from a Unified Data Management (UDM) apparatus, terminal subscription information including second information that indicates a restriction related to simultaneous use of network slices; and send, to the terminal, a registration accept message including a Single Network Slice Selection Assistance Information (S-NSSAI) and third information in a case where the first information and the second information are received, wherein the third information is included in the terminal subscription information and indicates for the S-NSSAI a restriction related to simultaneous use of network slices.

(Supplementary Note D6)

The AMF apparatus according to Supplementary Note D5, wherein the third information is included in the second information.

(Supplementary Note D7)

A terminal comprising:

at least one memory; and at least one processor coupled to the at least one memory and configured to:

send, to an Access and Mobility Management Function (AMF) apparatus, a registration request message including first information indicating support for a restriction feature related to simultaneous use of network slices; and receive, from the AMF apparatus, a registration accept message including a Single Network Slice Selection Assistance Information (S-NSSAI) and third information, in a case where the first information and second information are received by the AMF apparatus, wherein the second information is included in terminal subscription information and indicates a restriction related to simultaneous use of network slices, and the third information is included in the terminal subscription information and indicates for the S-NSSAI a restriction related to simultaneous use of network slices.

(Supplementary Note D8)

The terminal according to Supplementary Note D7, wherein the third information is included in the second information.

(Supplementary Note D9)

A non-transitory computer readable medium storing a program for causing a computer to perform a method for an Access and Mobility Management Function (AMF) apparatus, the method comprising:

receiving, from a terminal, a registration request message including first information indicating support for a restriction feature related to simultaneous use of network slices;

receiving, from a Unified Data Management (UDM) apparatus, terminal subscription information including second information that indicates a restriction related to simultaneous use of network slices; and sending, to the terminal, a registration accept message including a Single Network Slice Selection Assistance Information (S-NSSAI) and third information in a case where the first information and the second information are received, wherein the third information is included in the terminal subscription information and indicates for the S-NSSAI a restriction related to simultaneous use of network slices.

(Supplementary Note D10)

A non-transitory computer readable medium storing a program for causing a computer to perform a method for a terminal, the method comprising:

sending, to an Access and Mobility Management Function (AMF) apparatus, a registration request message including first information indicating support for a restriction feature related to simultaneous use of network slices; and receiving, from the AMF apparatus, a registration accept message including a Single Network Slice Selection Assistance Information (S-NSSAI) and third information, in a case where the first information and second information are received by the AMF apparatus, wherein the second information is included in terminal subscription information and indicates a restriction related to simultaneous use of network slices, and the third information is included in the terminal subscription information and indicates for the S-NSSAI a restriction related to simultaneous use of network slices.

This application is based upon and claims the benefit of priority from Japanese Patent Application No. 2020-174586, filed on Oct. 16, 2020, the disclosure of which is incorporated herein in its entirety by reference.

REFERENCE SIGNS LIST

1 UE
2 AMF
3 SMF
4 NSSF
5 AN
6 UPF
7 DN
8 UDM
9 PCF
1500, 1600 AN Node
2303 Baseband Processor
2304 Application Processor
2306 Memory
2307 Modules
12402 Processor
2403 Memory
2404 Modules
2504 Processor
2505 Memory
2506 Modules

What is claimed is:

1. A method performed by a core network node, the method comprising:

receiving, from a user equipment (UE), a registration request message including first information indicating support for a restriction feature related to simultaneous network slice registration;

receiving, from a network function, subscription information including second information indicating restrictions related to simultaneous registration of network slices;

sending, to the UE, a registration accept message including the second information; and receiving, from the UE, a registration request message including a Requested Network Slice Selection Assistance Information (Requested NSSAI), after a cell reselection based on the second information and third information, wherein the third information indicates a restriction and a list for slicing, and is provided in a System Information Block (SIB).

2. The method according to claim 1, wherein the core network node is an Access and Mobility Management Function (AMF) apparatus, and the network function is a Unified Data Management (UDM) apparatus.

3. A method performed by a user equipment (UE), the method comprising:

sending, to a core network node, a registration request message including first information indicating support for a restriction feature related to simultaneous network slice registration;

receiving, from the core network node, a registration accept message including second information; and sending, to the core network node, a registration request message including a Requested Network Slice Selection Assistance Information (Requested NSSAI), after a cell reselection based on the second information and third information, wherein the third information indicates a restriction and a list for slicing, and is received in a System Information Block (SIB), and wherein the second information is included in subscription information and indicates restrictions related to simultaneous registration of network slices.

4. The method according to claim 3, wherein the core network node is an Access and Mobility Management Function (AMF) apparatus.

5. A core network node comprising:

at least one memory; and at least one processor coupled to the at least one memory and configured to:

receive, from a user equipment (UE), a registration request message including first information indicating support for a restriction feature related to simultaneous network slice registration;

receive, from a network function, subscription information including second information indicating restrictions related to simultaneous registration of network slices;

send, to the UE, a registration accept message including the second information; and receive, from the UE, a registration request message including a Requested Network Slice Selection Assistance Information (Requested NSSAI), after a cell reselection based on the second information and third information, wherein the third information indicates a restriction and a list for slicing, and is provided in a System Information Block (SIB).

6. The core network node according to claim 5, wherein the core network node is an Access and Mobility Management Function (AMF) apparatus, and the network function is a Unified Data Management (UDM) apparatus.

* * * * *